US010562180B2

(12) United States Patent
Telleria et al.

(10) Patent No.: US 10,562,180 B2
(45) Date of Patent: Feb. 18, 2020

(54) FLUIDIC ROBOTIC ACTUATOR SYSTEM AND METHOD

(71) Applicant: Other Lab, LLC, San Francisco, CA (US)

(72) Inventors: Maria J. Telleria, Redwood City, CA (US); Jonathan B. Pompa, Long Beach, CA (US); Peter S. Lynn, Oakland, CA (US); Kevin B. Albert, San Francisco, CA (US); Gabriel F. Hein, El Cerrito, CA (US); Thomas F. Allen, Oakland, CA (US); Kevin C. Kemper, San Francisco, CA (US); Saul Thomas Griffith, San Francisco, CA (US)

(73) Assignee: OTHER LAB, LLC, San Francisco, CA (US)

( * ) Notice: Subject to any disclaimer, the term of this patent is extended or adjusted under 35 U.S.C. 154(b) by 118 days.

(21) Appl. No.: 15/472,740

(22) Filed: Mar. 29, 2017

(65) Prior Publication Data

US 2017/0282360 A1 Oct. 5, 2017

Related U.S. Application Data

(60) Provisional application No. 62/314,787, filed on Mar. 29, 2016.

(51) Int. Cl.
*B25J 9/14* (2006.01)
*F16J 3/04* (2006.01)
(Continued)

(52) U.S. Cl.
CPC .............. *B25J 9/142* (2013.01); *B25J 18/06* (2013.01); *F16J 3/04* (2013.01); *F15B 15/1404* (2013.01)

(58) Field of Classification Search
CPC .. B25J 9/142; B25J 18/06; B25J 3/048; F01B 19/04; F15B 15/1404
(Continued)

(56) References Cited

U.S. PATENT DOCUMENTS

| 979,460 A | 12/1910 | Fulton |
| 2,920,656 A | 1/1960 | Bertolet |

(Continued)

FOREIGN PATENT DOCUMENTS

| CA | 2330612 A1 | 6/2002 |
| CN | 101783619 A | 7/2010 |

(Continued)

OTHER PUBLICATIONS

"Final Rejection dated Sep. 9, 2016," U.S. Appl. No. 14/064,072, filed Oct. 25, 2013, 15 pages.
(Continued)

*Primary Examiner* — Michael Leslie
*Assistant Examiner* — Daniel S Collins
(74) *Attorney, Agent, or Firm* — Davis Wright Tremaine LLP

(57) ABSTRACT

A fluidic robotic actuator configured to assume at least a neutral position, the fluidic robotic actuator includes a first and second plate defining respective planar portions that are disposed in parallel planes in the neutral position. The fluidic robotic actuator also includes a plurality of elongated bellows extending between the first and second plates, the bellows each having a central main axis that is parallel to the central main axis of the other bellows in the neutral position, the main axis of the bellows being perpendicular to the parallel planes of the first and second plates in the neutral position, the bellows being coupled to the first and second plates at respective first and second ends of the bellows.

19 Claims, 18 Drawing Sheets

(51) Int. Cl.
*B25J 18/06* (2006.01)
*F15B 15/14* (2006.01)

(58) Field of Classification Search
USPC .................................................. 92/90, 91, 92
See application file for complete search history.

(56) References Cited

U.S. PATENT DOCUMENTS

| | | |
|---|---|---|
| 3,284,964 A | 11/1966 | Norio |
| 3,472,062 A | 10/1969 | Owen |
| 3,602,047 A | 8/1971 | Kistler |
| 3,800,398 A | 4/1974 | Harrington, Jr. |
| 3,956,543 A | 5/1976 | Stangeland |
| 3,982,526 A | 9/1976 | Barak |
| 4,063,543 A | 12/1977 | Hedger |
| 4,102,326 A | 7/1978 | Sommer |
| 4,120,635 A | 10/1978 | Langecker |
| 4,154,221 A | 5/1979 | Nelson |
| 4,172,443 A | 10/1979 | Sommer |
| 4,175,540 A | 11/1979 | Roantree et al. |
| 4,185,615 A | 1/1980 | Bottum |
| 4,198,954 A | 4/1980 | Meijer |
| 4,345,582 A | 8/1982 | Aharon |
| 4,424,802 A | 1/1984 | Winders |
| 4,459,972 A | 7/1984 | Moore |
| 4,464,980 A | 8/1984 | Yoshida |
| 4,494,417 A | 1/1985 | Larson et al. |
| 4,566,432 A | 1/1986 | Sobczak et al. |
| 4,620,771 A | 11/1986 | Dominguez |
| 4,751,868 A | 6/1988 | Paynter |
| 4,768,871 A | 9/1988 | Mittelhauser et al. |
| 4,784,042 A * | 11/1988 | Paynter .................... B25J 9/142 414/7 |
| 4,832,001 A | 5/1989 | Baer |
| 4,848,179 A | 7/1989 | Ubhayakar |
| 4,900,218 A | 2/1990 | Sutherland |
| 4,939,982 A | 7/1990 | Immega et al. |
| 4,954,952 A | 9/1990 | Ubhayakar et al. |
| 5,021,798 A | 6/1991 | Ubhayakar |
| 5,040,452 A | 8/1991 | Van Kerkvoort |
| 5,080,000 A | 1/1992 | Bubic et al. |
| 5,156,081 A | 10/1992 | Suzumori |
| 5,181,452 A | 1/1993 | Immega |
| 5,317,952 A | 6/1994 | Immega |
| 5,697,285 A | 12/1997 | Nappi et al. |
| 5,816,769 A | 10/1998 | Bauer et al. |
| 6,054,529 A | 4/2000 | O'Donnell et al. |
| 6,178,872 B1 | 1/2001 | Schulz |
| 6,557,804 B1 | 5/2003 | Carroll |
| 6,875,170 B2 | 4/2005 | Francois et al. |
| 7,331,273 B2 | 2/2008 | Kerekes et al. |
| 7,614,615 B2 | 11/2009 | Egolf |
| 8,201,473 B2 | 6/2012 | Knoll |
| 8,305,736 B2 | 11/2012 | Yee et al. |
| 8,657,271 B2 | 2/2014 | Szekely et al. |
| 8,700,215 B2 | 4/2014 | Komatsu et al. |
| 8,863,608 B2 | 10/2014 | Fischer et al. |
| 9,624,911 B1 | 4/2017 | Griffith et al. |
| 9,919,434 B1 | 3/2018 | Rey et al. |
| 2005/0034752 A1 | 2/2005 | Gross et al. |
| 2006/0049195 A1 | 3/2006 | Koussios et al. |
| 2009/0097994 A1 | 4/2009 | Beck et al. |
| 2009/0115292 A1 | 5/2009 | Ueda et al. |
| 2009/0151775 A1 | 6/2009 | Pietrzak |
| 2010/0043776 A1 | 2/2010 | Gee |
| 2010/0125401 A1 | 5/2010 | Hamama et al. |
| 2011/0114080 A1 | 5/2011 | Childers et al. |
| 2012/0210818 A1 * | 8/2012 | Fischer .................... B25J 9/142 74/490.04 |
| 2012/0285509 A1 | 11/2012 | Surganov |
| 2013/0247962 A1 | 9/2013 | Sakai et al. |

FOREIGN PATENT DOCUMENTS

| | | |
|---|---|---|
| CN | 103222067 A | 7/2013 |
| CN | 103786165 A | 5/2014 |
| CO | 6180473 A2 | 7/2010 |
| CO | 6450667 A2 | 5/2012 |
| EP | 2648226 A1 | 10/2013 |
| FR | 2603228 A1 | 3/1988 |
| KR | 101034478 B1 | 5/2011 |
| KR | 20130019502 A | 2/2013 |
| RU | 2516595 C2 | 5/2014 |
| RU | 2611571 C1 | 2/2017 |
| SU | 1346918 A1 | 10/1987 |
| WO | 2001017731 A1 | 3/2001 |
| WO | 2011094084 A2 | 8/2011 |
| WO | 12015378 A1 | 2/2012 |
| WO | 2016123592 A1 | 8/2016 |

OTHER PUBLICATIONS

"Non-Final Rejection dated Aug. 18, 2016," U.S. Appl. No. 14/064,071, filed Oct. 25, 2013, 13 pages.
Author Unkown, http://www.utilityscalesolar.com/Utility_Scale_Solar,Inc./USS_Homepage.html, Utility Scale Solar, Inc., 2011.
International Search Report and Written Opinion dated Aug. 14, 2017, International Patent Application No. PCT/US2017/024730, filed Mar. 29, 2017.
International Search Report and Written Opinion dated Aug. 2, 2018, International Patent Application No. PCT/US2018/028020, filed Apr. 17, 2018, 7 pages.
International Search Report and Written Opinion dated Aug. 2, 2018, International Patent Application No. PCT/US2018/028024, filed Apr. 17, 2018, 7 pages.
International Search Report and Written Opinion dated Aug. 9, 2018, International Patent Application No. PCT/US2018/028025, filed Apr. 17, 2018, 7 pages.
International Search Report and Written Opinion dated May 5, 2016, International Patent Application No. PCT/US2016/015857, filed Jan. 30, 2016.
SEBA, "Solar Trillions," pp. 246-250, Jan. 28, 2010.
The Wiley Encyclopedia of Packaging Technology 3rd Ed., Wiley Publications, p. 145, Sep. 2009.
International Search Report and Written Opinion dated Aug. 29, 2019, Patent Application No. PCT/US2019/034202, filed May 28, 2019, 7 pages.

* cited by examiner

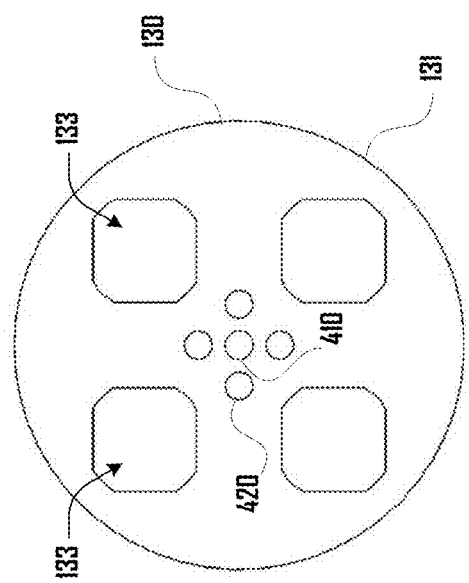
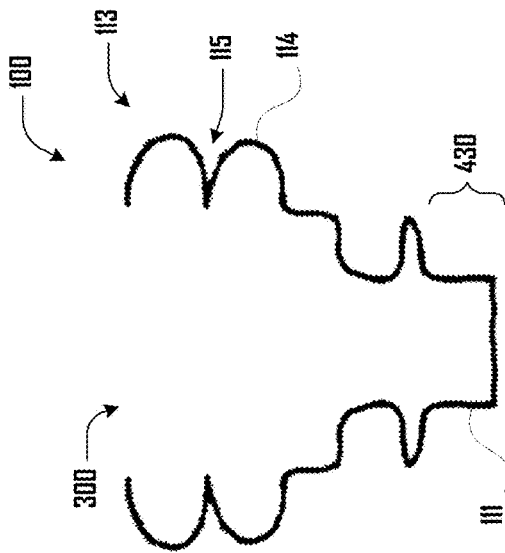
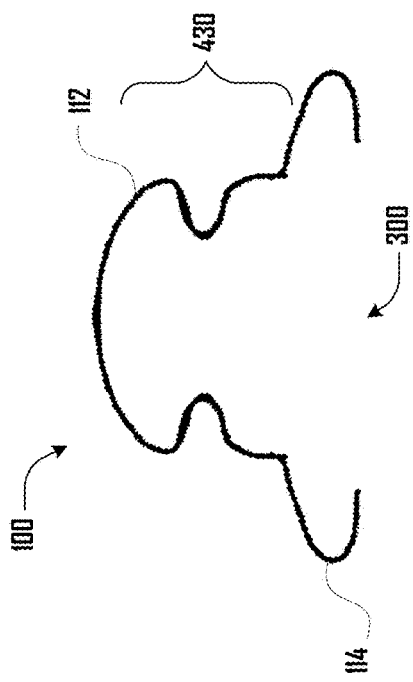
Fig. 4a
Fig. 4b
Fig. 4c

FLUIDIC ROBOTIC ACTUATOR SYSTEM AND METHOD

CROSS-REFERENCE TO RELATED APPLICATIONS

This application is a non-provisional of and claims the benefit of U.S. Provisional Application No. 62/314,787, filed Mar. 29, 2016, which application is hereby incorporated herein by reference in its entirety and for all purposes.

This application is also related to U.S. Non-Provisional patent application Ser. No. 14/064,071 filed Oct. 25, 2013 and U.S. Non-Provisional patent application Ser. No. 14/064,072 filed Oct. 25, 2013, which applications are hereby incorporated herein by reference in their entirety and for all purposes.

GOVERNMENT RIGHTS

This invention was made with government support under NASA-NNX15CA22C awarded by National Aeronautics and Space Administration. The government has certain rights in the invention.

BRIEF DESCRIPTION OF THE DRAWINGS

FIG. 4a illustrates an example embodiment of a plate that comprises four polygon coupling ports configured to engage with an end of a bellows having a corresponding shape and size such that the bellows are prevented from rotating about a central axis of the bellows.

FIGS. 4b and 4c illustrate two example cross-sectional profiles of a first end and second end of a bellows, which include a convolution portion between the ends having axial symmetry, and with a portion at the respective first and second end being without axial symmetry.

Figure 1:
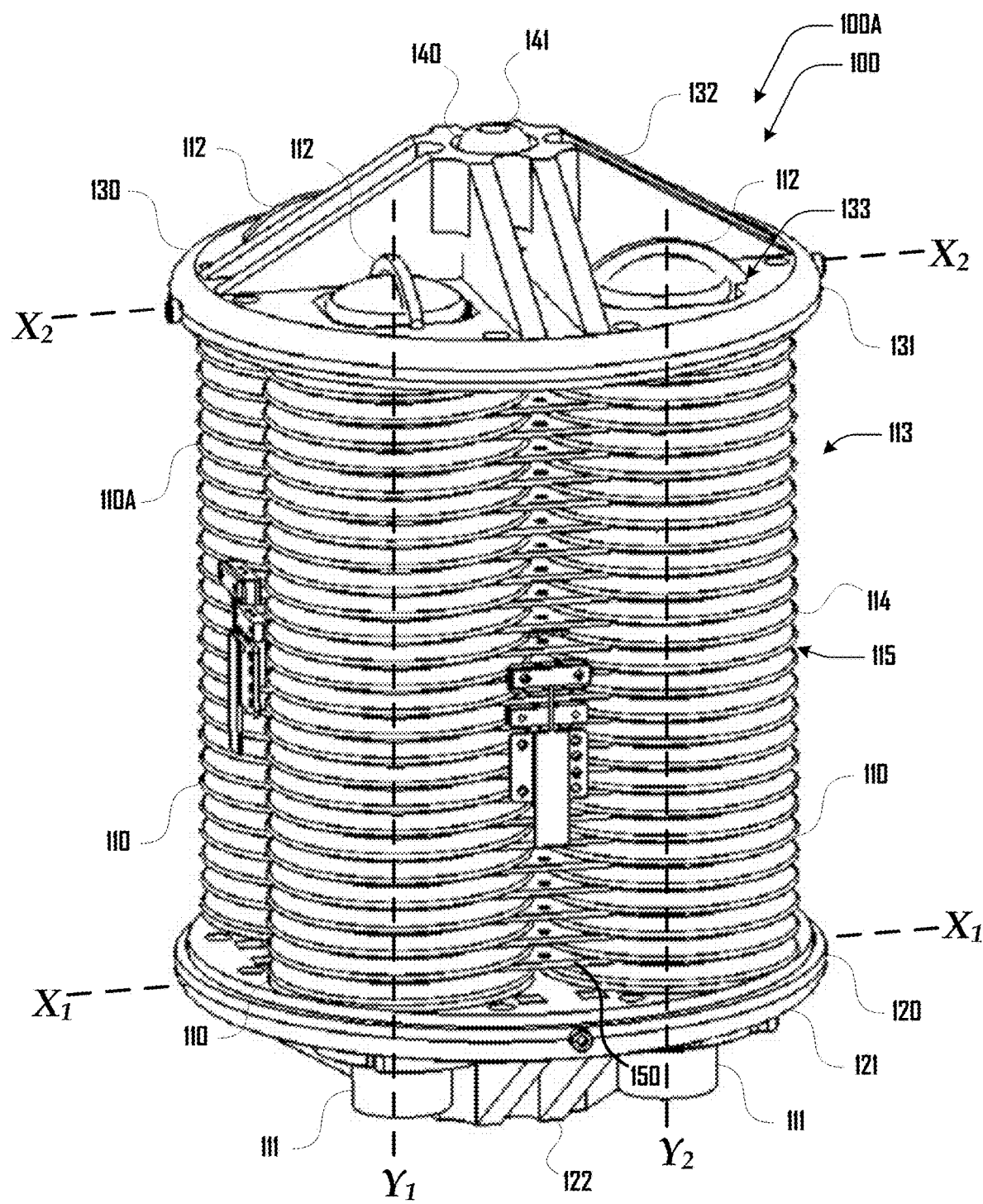
FIG. 1 is a first perspective view of a fluidic robotic actuator in accordance with one embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

This disclosure presents embodiments of a robotic actuator that can be used to create force, torque, position, or movement by increasing the pressure or volume in a system of bellows of the actuator. In some embodiments, pressure sensors may be used to measure the pressure in each bellows chamber or the relative pressure between opposing bellows chambers. In various embodiments, the bellows of an actuator can be constrained to create an actuator joint using a pair of high-strength end plates and a low-stretch spine that sets the distance between the plates. The plates and bellows can be constructed such that the plates constrain both the length of the bellows and rotation about their own axis. In some embodiments, the bellows can be strengthened in their hoop direction by wrapping the convolutions of the bellows using a high-strength fiber or wire.

The bellows can be constrained radially through a combination of high-strength, high-stiffness plates, ribs, restraints, or the like. The restraints can comprise a fiber, wire or other mechanism. The ribs and/or end plates can be designed to allow for fluid lines and electrical wires to transverse the joint through or near its center. Features can be molded into the bellows to facilitate constraint to the end-plates, ribs or spine. The actuator design may utilize foam or another damping mechanism in parallel with the bellows, as well as a spring or other stiffening member. One or more sensor can be included in the mechanism to measure the angle of the end plates relative to each other. The sensor can be a position sensor which estimates the angle of the joint by measuring the spacing between the actuator ribs or bellows convolutions.

In one embodiment, an actuator comprises four bellows and a flexible spine with a high axial stiffness. The resulting two degree-of-freedom joint can behave similarly to a ball-and-socket joint. The bellows can be designed with a square shape and radial features to enable locking to the end plates. The plate can have square cutouts that prevent the bellows from rotating about their own axis. The end plates can be constructed using a truss design which increases their strength and stiffness per weight and transmits the axial force of the bellows to a torque about the spine.

The bellows can be wrapped using a high strength fiber, such as spectra or carbon fiber, around each of their inner convolutions to increase their pressure capacity. High strength and stiffness can support the inner convolutions of the bellows. Damping foam can be placed between the ribs. The four bellows can be constrained to each other, the ribs and the spine using another high strength fiber. The group of bellows can then be locked to the end plates using clip mechanisms, or the like. The actuator can be compressed so that the length of the bellows is reduced to an operating length and so that the spine sets the distance between the plates.

An optical encoder head can be attached to a rib between two bellows and the encoder strip can be attached another rib in between the same two bellows. A separate encoder system can be placed in the same manner but between the adjoining bellows such that each encoder reads one degree of freedom. The encoder strips can be mounted on flexures that only constrain the motion normal to the plane of the ribs such that only the change in spacing between the ribs is captured by the encoder. Such embodiments and more are further discussed herein.

Figure 2:
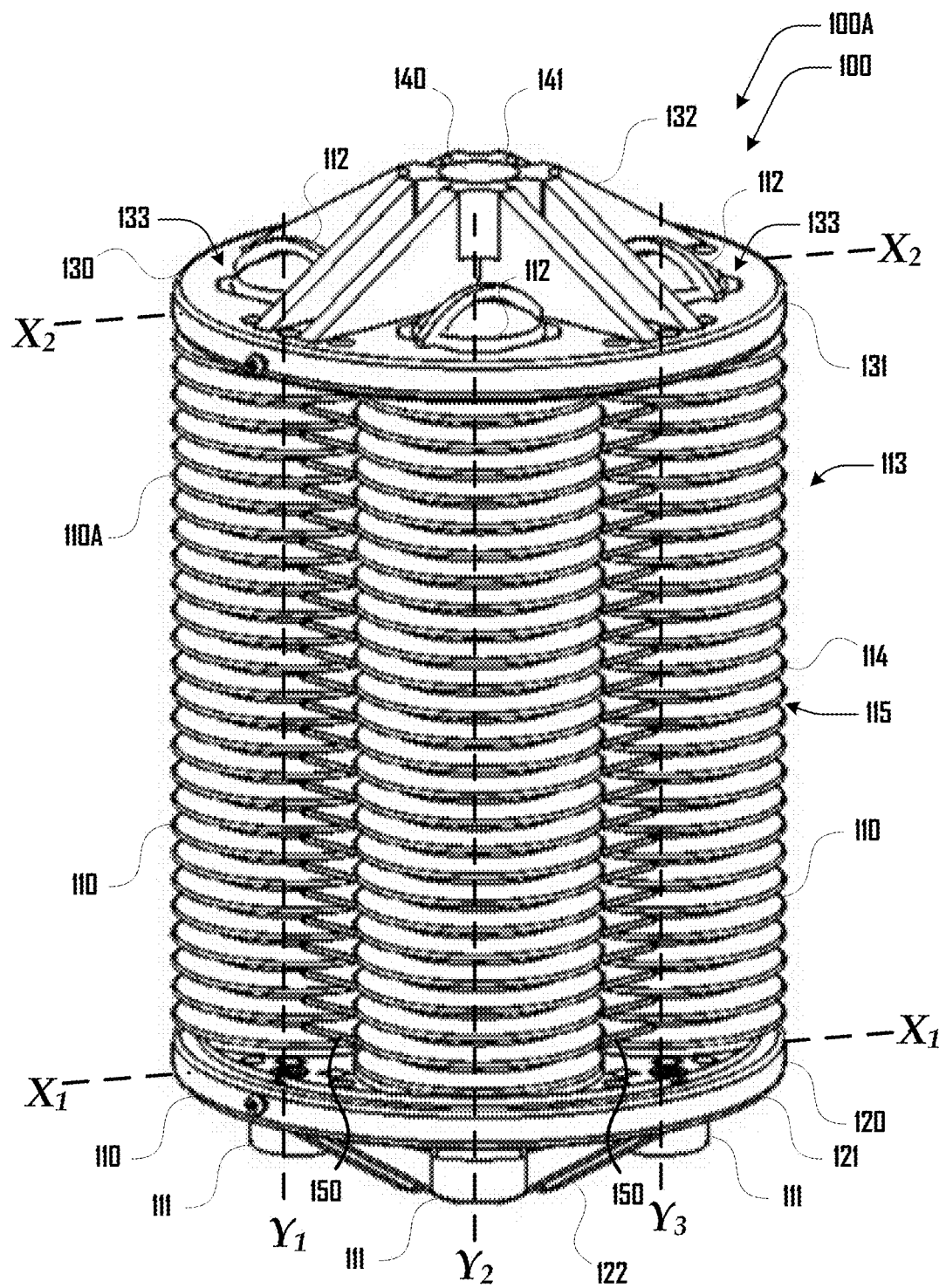
FIG. 2 is a second perspective view of the fluidic robotic actuator of FIG. 1.

Turning to the figures, FIGS. 1 and 2 are perspective views of a robotic actuator 100 in accordance with one embodiment 100A. As shown in the embodiment 100A of FIGS. 1 and 2, the example robotic actuator 100 comprises four bellows 110 disposed and extending between a first and second plate 120, 130. A spine 140 also extends between the first and second plate 120, 130 as described in more detail herein. Additionally, a plurality of ribs 150 extend between and engage the bellows 110 as also described in more detail herein.

In this example configuration, the four bellows 110 each extend along a respective and parallel axis Y. For example, FIG. 2 shows axes parallel axes $Y_1$, $Y_2$, $Y_3$ of a first, second and third bellows 110 that are visible in this perspective, with a fourth bellows 110 being obscured in this perspective, but also extending along an axis that is parallel to axes $Y_1$, $Y_2$, $Y_3$. In this embodiment 100A, the bellows 110 are generally cylindrical in shape and extend from a first end 111 to a second end 112, with the first ends 111 respectively engaging and extending through a portion of the first plate 120 and with the second ends 112 respectively engaging and extending through a portion of the second plate 130.

The portion of the length of the bellows 110 between the first and second plate 120, 130 can be defined by a plurality of convolutions 113 defined by alternating peaks 114 and valleys 115 along the length of the bellows 110. In various embodiments, the portion of the bellows 110 between the first and second plate 120, 130 can have circular radial symmetry and/or axial symmetry about main axis Y of the bellows 110, with the portions of the bellows 110 extending through the first and second plate 120, 130 at the first and second end 111, 112 lacking circular radial symmetry or axial symmetry (however, in various embodiments, such portions may comprise polygonal radial symmetry, or other symmetry about one or more plane of symmetry as discussed herein).

The first and second plate 120, 130 of some embodiments can be designed to be high-strength and high-stiffness while minimizing weight. In various embodiments, first and second plates 120, 130 can act to translate the axial force of the bellows 110 to a torque about a plate 120, 130 or an angle between the two plates 120, 130. In one embodiment 100A, the plates 120, 130 comprise a truss structure 122, 132, as shown in FIGS. 1 and 2, which can increase axial stiffness and strength. The truss structures 122, 132 can repeat between bellows 110.

The first and second plate 120, 130 can comprise a respective circular planar portion 121, 131 with respective support architectures 122, 132 extending from the planar portions 121, 131. The first and second plate 120, 130 can respectively define four coupling ports configured to engage the bellows 110 and allow the first and second ends 111, 112 of the bellows 110 to extend through the first and second plates 120, 130. For example, coupling ports 133 of the second plate 130 are shown in FIGS. 1 and 2 and described in more detail herein.

The planar portions 121, 131 of the first and second plates 120, 130 can extend along respective and parallel axes $X_1$ and $X_2$, which are perpendicular to the Y axes (e.g., $Y_1$, $Y_2$, $Y_3$) of the bellows 110 as shown in FIGS. 1 and 2. However as discussed in more detail herein, the bellows 110 can be configured to independently expand and/or contract such that the first and second plates 120, 130 can move and rotate relative to each other with one or more degrees of freedom. Accordingly, while FIGS. 1 and 2 illustrate one example configuration where axes X ($X_1$ and $X_2$) are perpendicular to axes Y (e.g., $Y_1$, $Y_2$, $Y_3$), which is described herein as a "neutral" position in accordance with some embodiments, further configurations provide for such axes being non-perpendicular and/or non-parallel as described in more detail herein.

Additionally, as shown in FIGS. 1 and 2, and as described herein, embodiments having four bellows 110 can include the bellows 100 disposed in a square arrangement. For example, in the configuration of FIGS. 1 and 2, with main axes Y (e.g., $Y_1$, $Y_2$, $Y_3$) of the bellows 110 defining a central axis of radial symmetry for the bellows 110, such main axes Y (e.g., $Y_1$, $Y_2$, $Y_3$) can be in a square arrangement such that axes Y (e.g., $Y_1$, $Y_2$, $Y_3$) are disposed at corners of a square or along edges of a rectangular prism having at least one square cross section.

Figure 14:
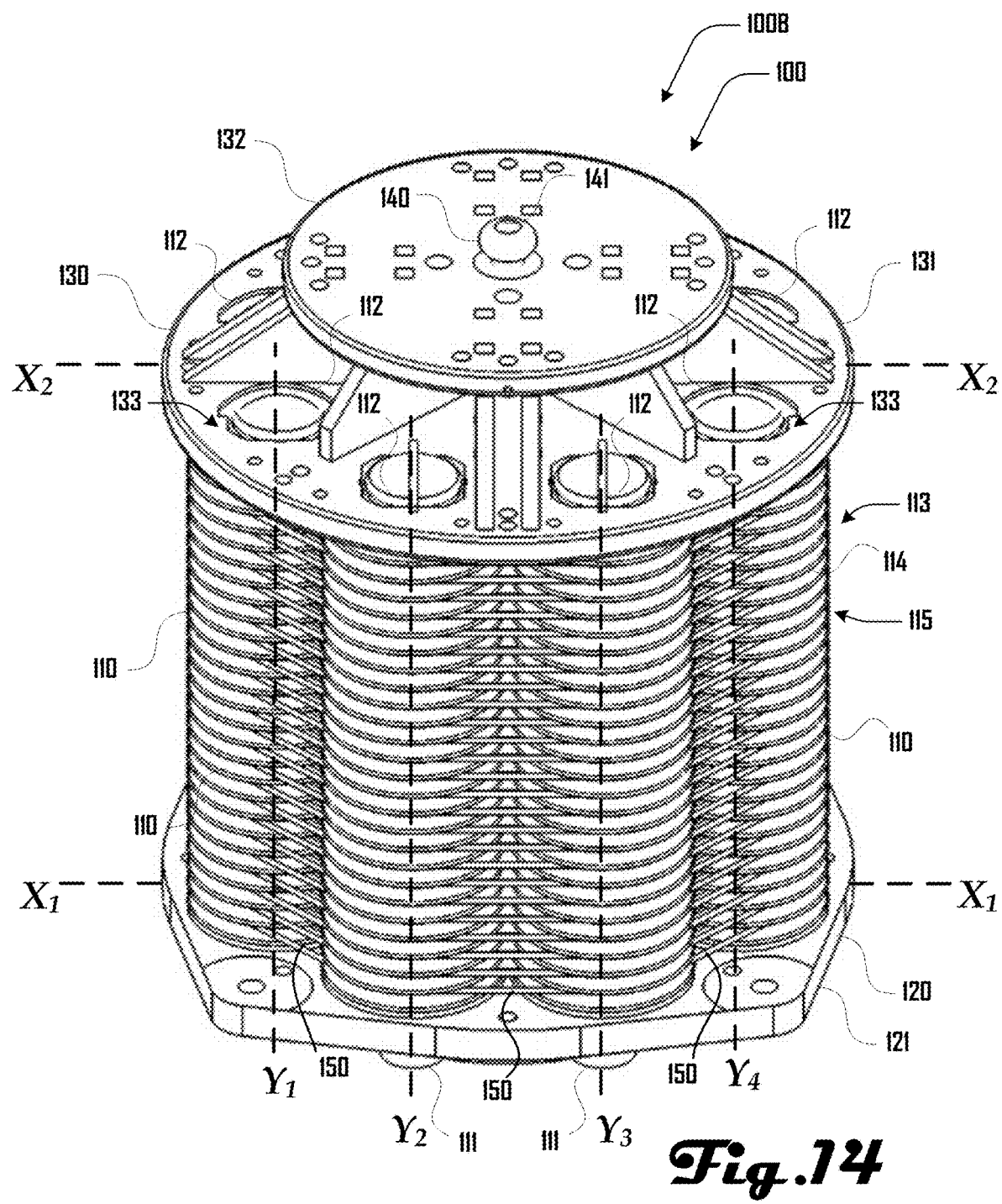
FIG. 14 illustrates an example embodiment of an actuator comprising eight bellows in an octagonal configuration.

While FIGS. 1 and 2 illustrate an embodiment 100A of an actuator 100 having four bellows 110, further embodiments can include any suitable plurality of bellows 110, including two, three, four, five, six, seven, eight, nine, ten, eleven, twelve, or the like. For example, FIG. 14 illustrates an example embodiment 100B of an actuator 100 having eight bellows 110.

Figure 3:
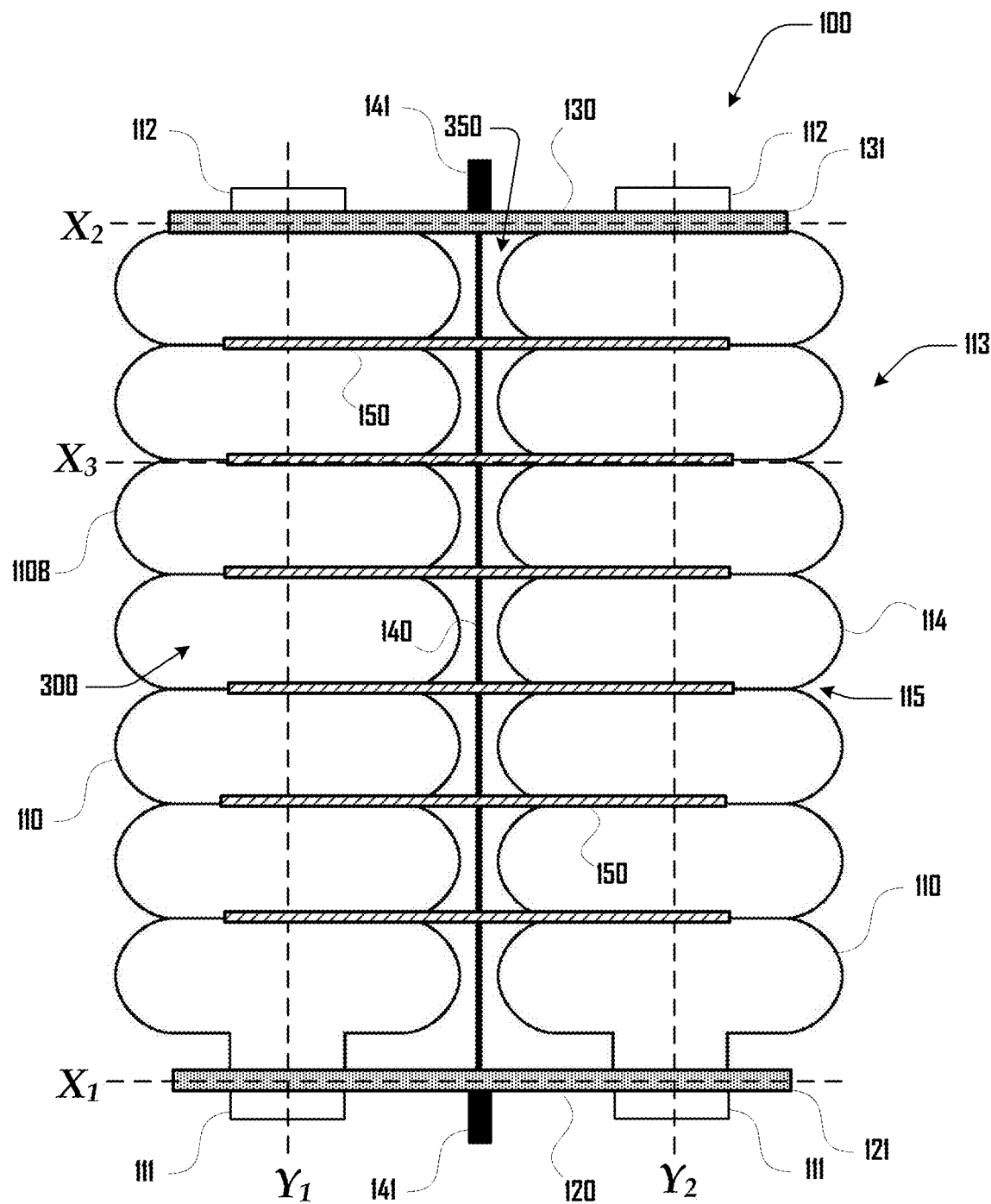
FIG. 3 is a cross-sectional side view of an actuator having a first and second bellows with a spine and ribs disposed therebetween.

Turning to FIG. 3, a cross-sectional side view of an actuator 100 is shown having a first and second bellows 110 which are hollow and define an internal cavity 300 that is configured to hold a volume fluid at a pressure. The illustration of FIG. 3 can represent a portion of the actuator embodiment 100A shown in FIGS. 1 and 2, but can also be applicable to various other embodiments of actuators 100, including various embodiments having two or more bellows 110. In one example, FIG. 3 can illustrate a portion of the actuator embodiment 100B illustrated in FIG. 14, which is discussed in more detail herein.

As shown in FIG. 3, the actuator comprises a pair of bellows 110 extending between a first and second plate 120, 130, with first ends 111 of the bellows 110 extending through and engaging the first plate 120, and with the second ends 112 of the bellows 110 extending through and engaging the second plate 130. A spine 140 extends between the bellows in a cavity 350 between the bellows 110 and the spine 140 is coupled to the first and second plate 120, 130 via a pair of caps 141. The spine 140 extends parallel to axes $Y_1$ and $Y_2$ of the bellows 110. In various embodiments, the spine 140 is disposed equidistant from the axes $Y_1$ and $Y_2$ of the bellows 110. Additionally, the spine 140 extends perpendicular to axes $X_1$ and $X_2$ defined by the planar portions 121, 131 of the first and second plate 120, 130.

In various embodiments, axial distance between the plates 120, 130 and the length of the bellows 110 in the joint neutral position, where the plates 120, 130 are parallel to each other, can be set by the spine 140, which connects the plates 120, 130 at their center in accordance with some example embodiments herein (e.g., FIGS. 1 and 2).

In some embodiments, it can be desirable for the spine 140 to be high-strength and/or high-modulus. For example, the spine 140 can exhibit a high stiffness in the axial direction which prevents the distance between the plates 120, 130 from increasing. The spine 140 can be compliant in at least one orientation which allows the actuator 100 to bend. Embodiments having a spine 140 that is compliant in all other directions except for axially can enable the creation of a two degree of freedom joint (e.g., FIGS. 1 and 2).

The range of motion of the actuator 100 can be dictated by the maximum extended length of the bellows 110, the minimum compressed length of the bellows 110, and the radial spacing of the bellows 110 relative to the central spine 140 or each other. The radial spacing of the bellows 110 and the number of bellows 100 that compose the actuator 100 can be tuned to change the torque, force output, range of motion, stiffness, damping, and resolution of the actuator 100 as desired.

In various embodiments, the spine 140 can be configured to bend, but not expand or contract along the length of the spine 140, which can be desirable for supporting actuation of the actuator 100 as described herein. In some embodiments, the spine 140 can be designed to have a particular desired bending stiffness, which can be equal or unequal on various axes of bending. In some embodiments, it can be desirable to have the spine 140 provide a force directed toward a neutral position of the actuator 100 to add to the actively generated force of the actuator 100. For example, where the actuator 100 is bent to attach to a load, the spine 140 can be configured to compensate for the weight of the load as the load is lifted.

The spine 140 can comprise various suitable materials, including a metal cable, a rope, coil, or the like. For example, suitable materials for a spine 140 can include spring metals such as steel or copper alloys, wire-rope, composite layups comprising carbon, fiberglass, Kevlar, and the like, or composite "pulltrusions" with axially aligned fibers embedded in thermoplastic or thermoset matrices.

The actuator 100 further comprises a plurality of ribs 150, which extend between and engage the bellows 100. In various embodiments, the ribs 150 can comprise a rigid planar member that engages the bellows 110 of the actuator 100 along the length of the bellows 110. For example, as shown in FIG. 3, the actuator 100 comprises a plurality of ribs 150 that extend along an axis (e.g., $X_3$) that is parallel to axes $X_1$ and $X_2$ defined by the planar portions 121, 131 of the first and second plate 120, 130. Additionally, in this example, the ribs 150 are shown engaging the valley portions 115 of the convolutions 113.

In some embodiments, ribs 150 can be constructed and designed to achieve high stiffness with minimum mass. A high stiffness of the ribs 150 can be desirable in some embodiments to prevent in-plane squirm of the bellows 110, or in other words, to maintain the convolutions 113 parallel to each other. The ribs 150 may be used to constrain every convolution valley 115 of the bellows 110 or only some of the convolution valleys 115. For example, every other valley 115 can be constrained, only central valleys 115 in the middle of the bellows 110 along the length of the bellows 110 between the plates 120, 130 can be constrained, or the like.

The ribs 150 can be constructed of a variety of suitable materials including PET, carbon fiber, Garolite, aluminum, steel, titanium, acetal, and the like. In some embodiments, materials can be selected for high strength and/or high stiffness. The ribs 150 can be designed to have a 2D profile or they can comprise a 3D shape to increase stiffness. The ribs 150 can be individual pieces that are inserted into the spine 140 or they can be a single piece that fits multiple convolutions 113 of the bellows 110. In one embodiment of the actuator 100, the ribs 150 can be blow molded in conjunction with the bellows 110 or the bellows 110 can be blow molded directly onto a rib structure.

Figure 5A:
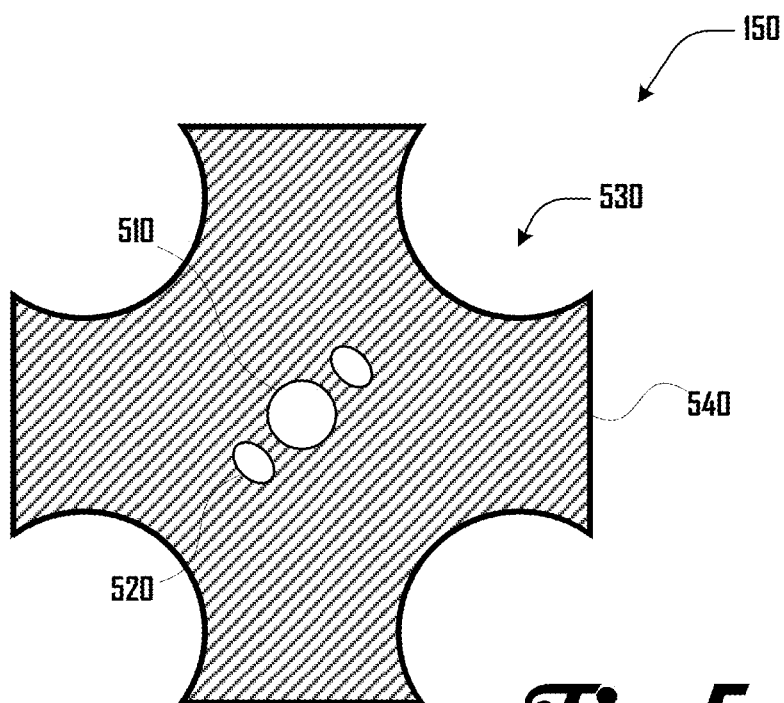
FIGS. 5a and 5b illustrate one embodiment of a rib configured to engage with four bellows of an actuator.
Figure 5B:
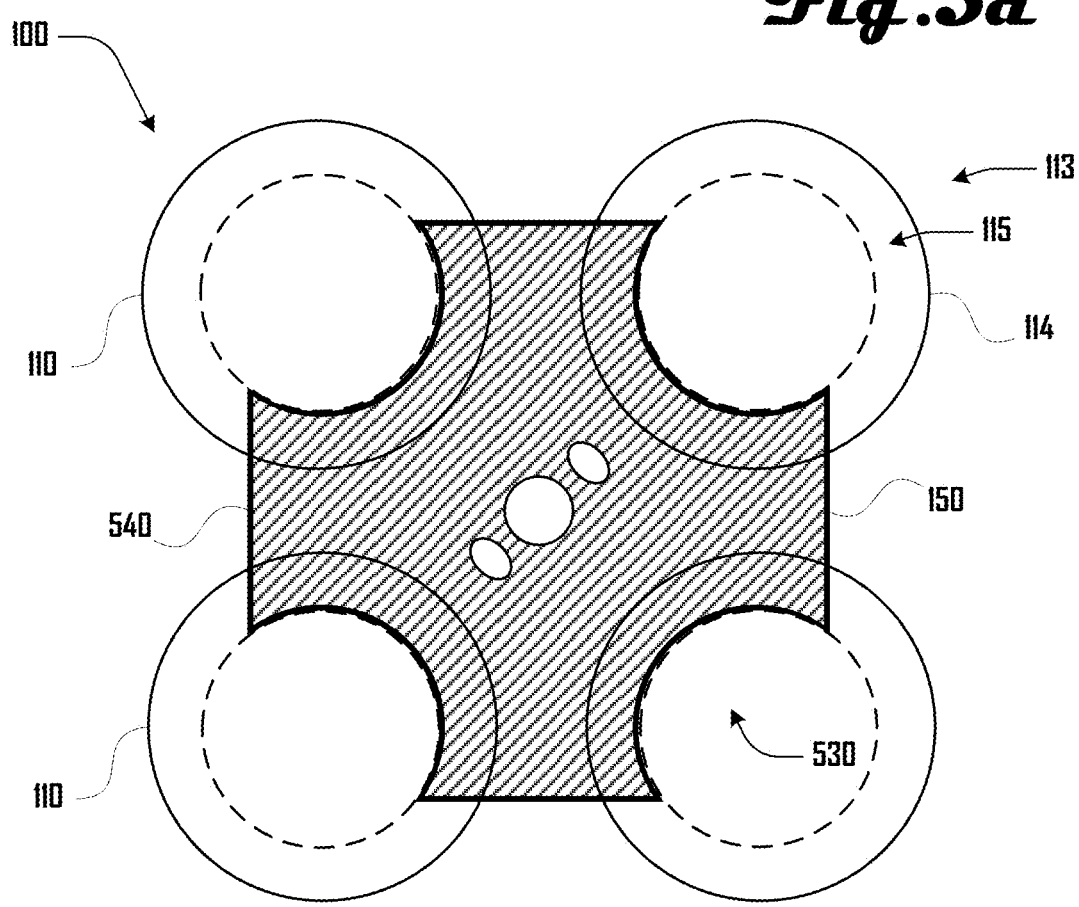

FIGS. 5a and 5b illustrate one embodiment of a rib 150 configured to engage with four bellows 110 of an actuator 100. The rib 150 of FIGS. 5a and 5b is generally square with crescent portions 530 cutout at the corners leaving linear edges 540. As shown in FIG. 5a, the crescent portions 530 are configured to engage within the valley portions 115 of convolutions 113. Having ribs 150 configured to engage with the valley portions 115 of the convolutions 113 can be desirable because it can allow the ribs 150 to float within the valley portions 115 without being fixedly coupled via an adhesive, coupling structure, or the like. However, in further embodiments, ribs 150 can be configured to couple with various suitable portions of bellows 110. Additionally, in further embodiments, ribs 150 can be configured to engage with any suitable plurality of bellows 110. In some embodiments, the bellows 110 and ribs 150 can be a unitary and/or contiguous structure. For example, in one embodiment the bellows 110 and ribs 150 can be molded or fabricated as a single unit. In another example, one or more ribs 150 can be molded around the bellows 110 or vice versa.

The ribs 150 can also include a spine port 510 and conduit ports 520 as shown in FIGS. 5*a* and 5*b*. In various embodiments, the spine port 510 can be configured for a spine 150 (see e.g., FIGS. 3 and 6*b*) to extend therethrough. Accordingly, in embodiments of an actuator 100 comprising a plurality of ribs 150 (e.g., FIG. 3), the spine 140 can extend through the plurality of ribs 150 via respective spine ports 510 of the ribs 150. As shown in FIGS. 5*a* and 5*b*, the spine ports 510 can be centrally located on the ribs 150, and the spine 140 can accordingly be disposed equidistant from the four bellows 110 within the cavity 350 between the bellows 110.

However, in further embodiments, the spine 140 and spine ports 510 of ribs 150 can be located in various suitable locations, which can be adapted for embodiments of actuators 100 having any suitable plurality of bellows 110 (e.g., the actuator embodiment 100B of FIG. 14 having eight bellows 110). Additionally, further embodiments can comprise any suitable plurality of spines 140, which can be configured to extend through one or more spine port 510 of one or more ribs 150, and in some embodiments, a spine 140 can be absent from an actuator 100.

In various embodiments, the spine port 510 can be shaped and sized to correspond to the shape and size of the spine 140. For example, as shown in FIG. 6*b*, the spine port 510 can be configured to be the same size as the spine 140 such that the spine 140 engages the portion of the rib 150 that defines the spine port 510. In this example, the spine 150 is cylindrical and the spine port 510 is also cylindrical to match the shape and size of the spine 150 extending therethrough.

The conduit ports 520 can be disposed on opposing sides of the spine port 510 as illustrated in FIGS. 5*a* and 5*b* and can be configured to allow various structures to extend through the ribs within the cavity 350 between bellows 110. For example, in various embodiments, one or more actuator 100 can comprise a portion of a fluidic robotic actuator 1600 (e.g., 16*a*, 16*b*, 17 and 18). As described in more detail herein, movement of the fluidic robotic actuator 1600 can be achieved via introduction and/or removal of fluid from the internal cavities 300 of the bellows 110 of the one or more actuators 100 that make up the fluidic robotic actuator 1600. Coordination of such movement can be controlled and monitored by various fluid pumps, sensors, control modules and like.

Accordingly, fluid lines, communication lines, power lines, and the like, can extend within the body of the fluidic robotic actuator 1600. In various embodiments, such lines can extend through one or more conduit ports 520. For example, where a fluidic robotic actuator 1600 comprises a plurality of actuators 100 in series, such lines can extend through one or more of the plurality of actuators 100 to support the plurality of actuators 100, in other words, lines extending through conduit ports 520 can be associated with the actuator 100 that a rib 150 is disposed in and/or can be associated with one or more actuators 100 that are upstream or downstream within a fluidic robotic actuator 1600.

Such lines can extend linearly through a plurality of ribs 150 or can be wrapped, wound, or otherwise encircle the spine 140. Embodiments having such lines in a wound or helical configuration can be desirable because such a configuration can allow for elongation or compression of the lines as the actuator moves, which can help prevent the lines from undesirably impeding or otherwise affecting the movement of the actuator 100. Such a wrapping can place the line(s) both on an outside (lengthening side) and an inside (shortening side) of the spine 140 as the actuator 100 changes shape as discussed herein.

Additionally, placing the lines near or at the center of the actuator 100 can protect them from the environment. In addition, the center of the actuator 100 maintains a constant length in various embodiments, so locating such lines near the center of the actuator 100 can reduce the need for long service loops. The ribs 140 and end plates 120, 130 can comprise features to guide, hold or otherwise engage such lines.

Although some embodiments can include two conduit ports 520 as illustrated in FIGS. 5*a* and 5*b*, in further embodiments, any suitable number of conduit ports 520 can be present in a rib 150, with any suitable size and shape. For example, as illustrated in FIG. 4*a*, a plate 130 can comprise four conduit ports 520.

In various embodiments, the ends 111, 112 of the bellows 110 of an actuator 100 can be coupled to the plates 120, 130 such that the plates 120, 130 constrain the radial position of the bellows 110 relative to each other and/or the spine 140. For example, FIG. 4*a* illustrates an example embodiment of a second plate 130 that comprises four polygon coupling ports 133 configured to engage with an end 112 of a bellows 110 having a corresponding shape and size such that the bellows 110 are prevented from rotating about the radial axis Y of the bellows 110 (e.g., radial axis $Y_1$, $Y_2$, or $Y_3$ shown in FIG. 2) when the bellows 110 are coupled within the coupling slots 133.

While numerous morphologies of ends 111, 112 of bellows 110 are contemplated within the scope and spirit of the present disclosure, FIGS. 4*b* and 4*c* illustrate two example cross-sectional profiles of a first end 111 and second end of a bellows 112, which include a convolution portion 113 between the ends 111, 112 having circular radial symmetry, and with a portion 430 at the respective first and second end 111, 112 being without circular radial symmetry. The portion without circular radial symmetry 430 can be configured to couple with coupling slots 133 of the first and second plates 120, 130 such that the bellows 110 are prevented from rotating about the radial axis Y of the bellows 110 as described herein.

Accordingly, various embodiments comprise bellows 110 having a contiguous portion of convolutions 113 extending between the first and second end 111, 112 of the bellows 110 with portions 430 lacking circular radial symmetry proximate to the first and second end 111, 112. For example, in some embodiments of an actuator 100, the portions of the bellows 110 disposed between the plates 120, 130 comprise circular radial symmetry when the actuator 100 is in a neutral configuration, with portions 430 lacking circular radial symmetry being present at the first and second end 111, 112 of the bellows 110 at least where the ends 111, 112 engage an internal portion of the coupling slots 133 to constrain the radial position of the bellows 110 relative to each other. Portions at the distal portion of the ends 111, 112 may or may not have circular radial symmetry. Additionally, portions 430 that lack circular radial symmetry at the ends can have other types of radial symmetry, such as a polygon, star or the like, and/or can have symmetry about one or more plane.

The ends 111, 112 of the bellows 110 can be further locked to the plates 120, 130 using clips that fit between the plate 120, 130 and a feature that is molded into the ends 111, 112 of the bellows 110. For example, threaded features can be molded into the bellows 110 or the corresponding pre-form which enable attachment of the plates 120, 130 or other components directly to the bellows 110. FIGS. 4*b* and 4*c* illustrate example embodiments of such molded features. Locking clips can prevent the bellows 110 from separating from the respective plates 120, 130, or retreating back through the coupling ports 133, during actuation, high loading conditions, or the like.

In various embodiments, it can be desirable to reinforce the valley portions 115 of the convolutions 113 of the bellows to increase the pressure capacity of the actuator 100. For example, in some embodiments, under high pressures without any constraints, the valley portions 115 of the convolutions 113 can invert or prolapse due to the pressure within the internal cavity 300 of the bellows 110 which cause a radial force on the convolutions 113.

In some embodiments, the pressure capacity of the bellows 110 can be increased by increasing the hoop stiffness and strength of the convolutions 113 using a high stiffness, high strength material to create a ring or wrap around the inner convolution or valley portion 115 of the convolutions 113. In one embodiment, such strengthening can comprise placing high strength, high stiffness rings into a blow molding mold such that when a bellows 110 is formed, the inner convolutions 115 are defined by the rings. Possible ring materials include but are not limited to aluminum, steel, carbon fiber, spectra, Kevlar, titanium, polyethylene terephthalate (PET), and the like.

In further embodiments, the bellows 110 can be reinforced and/or constrained by wrapping fibers, fabric, chain, wire, rope, chord, strap, or the like, around the inner convolutions 115 of the bellows 110. For example, FIGS. 6a, 6b, 7, 8a and 8b illustrate various example embodiments of a line 610 being wrapped around portions of an actuator 100, including the valley portions 115 of the convolutions 113 of the bellows 110.

Figure 6A:
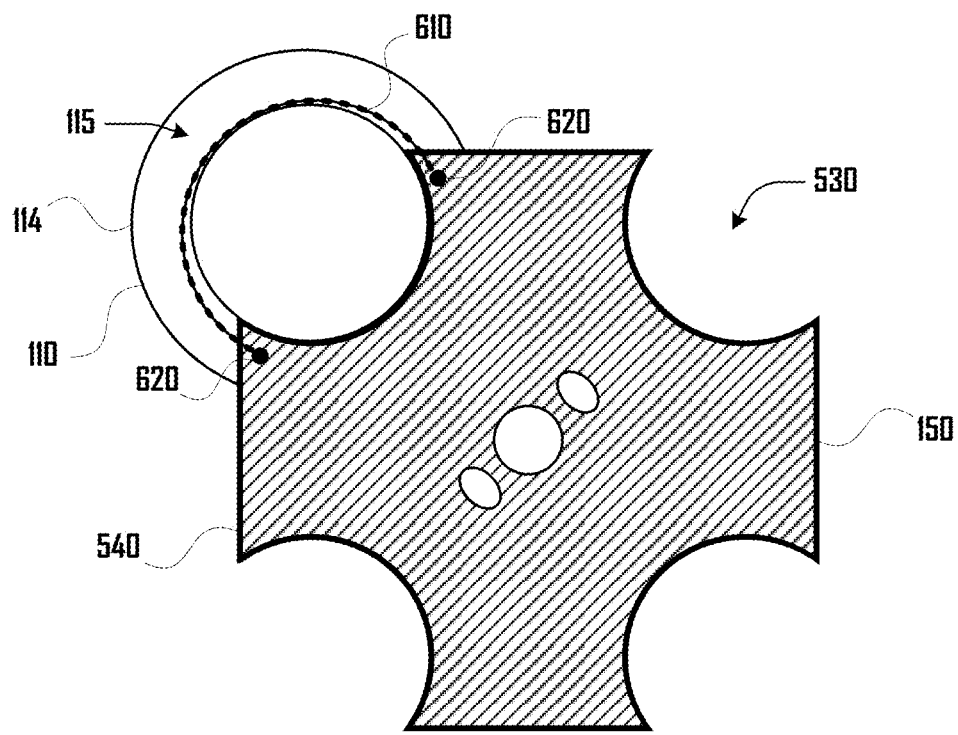
FIG. 6a is a top cross-sectional view of a bellows coupled within a crescent portion of a rib via a line that surrounds and resides within a portion of a valley of the bellows and is coupled to the rib via a pair of anchors disposed proximate to an edge of the rib.
Figure 6B:
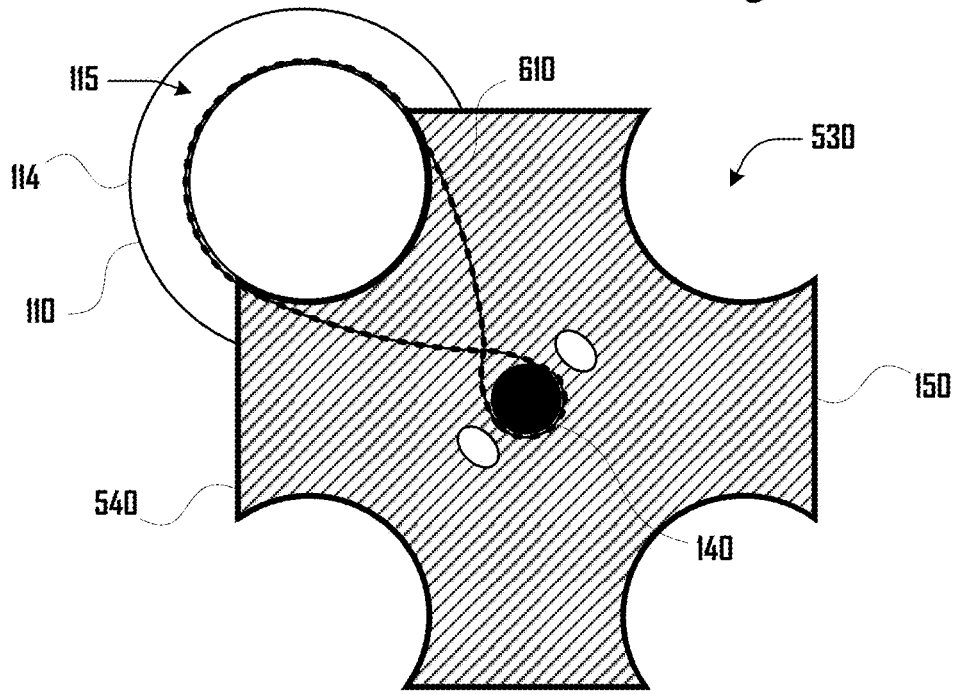
FIG. 6b is a top cross-sectional view of a bellows coupled within a crescent portion of a rib via a line that surrounds and resides within a portion of a valley of the bellows, with the line further extending and surrounding the stem.

FIG. 6a is a top cross-sectional view of a bellows 110 coupled within a crescent portion 530 of a rib 150 via a line 610 that surrounds and resides within a portion of a valley 115 of the bellows 110. The line 610 is shown coupled to the rib 150 via a pair of anchors 620 disposed proximate to an edge of the rib 150. FIG. 6b is a top cross-sectional view of a bellows 110 coupled within a crescent portion 530 of a rib 150 via a line 610 that surrounds and resides within a portion of a valley 115 of the bellows 110, with the line 610 further extending and surrounding the stem 140 with or without a twist. FIGS. 6a and 6b illustrate a single bellows 110 for purposes of clarity, but it should be clear that four bellows 110 (e.g., as in FIG. 5b) can be reinforced and/or constrained via a similar configuration of a line 610.

Figure 7:
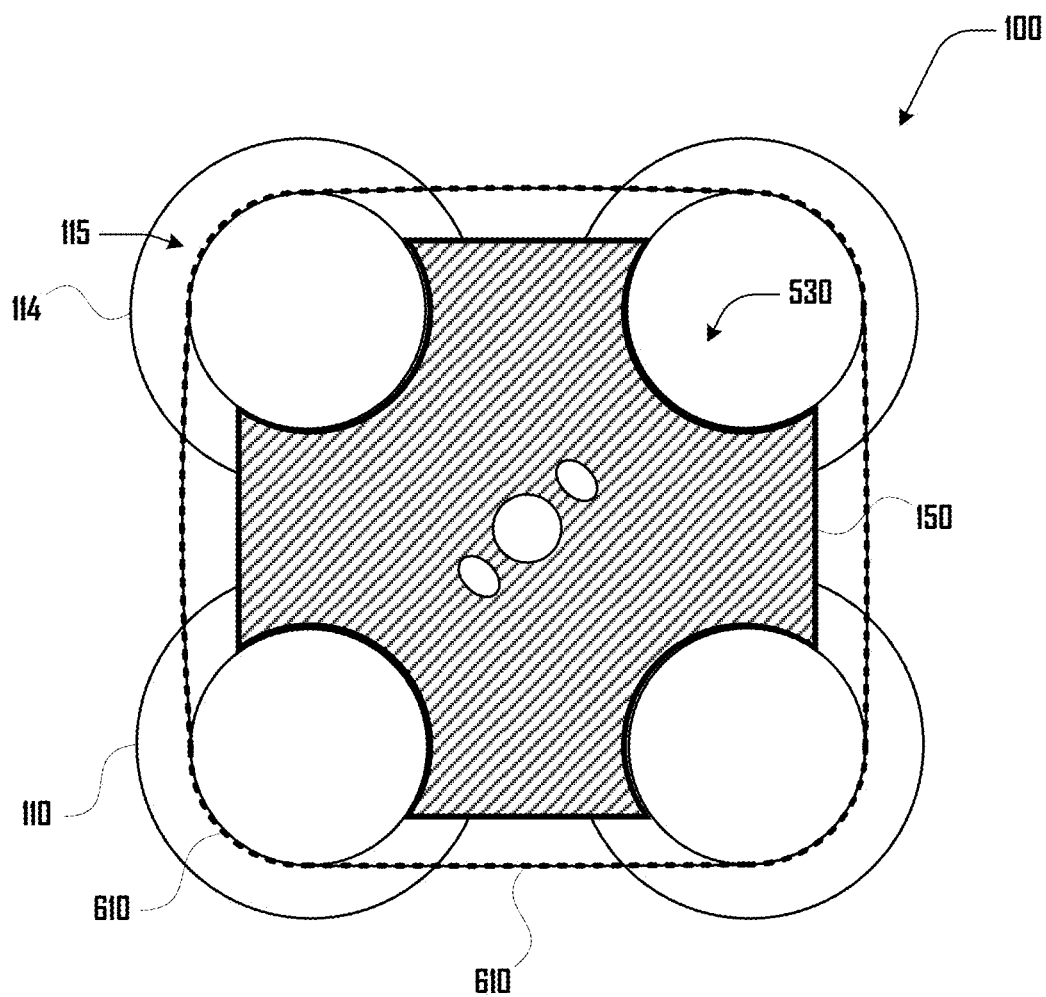
FIG. 7 illustrates a line reinforcing and/or constraining four bellows of an actuator with the line surrounding a perimeter of the bellows and residing within respective valleys of the bellows.
Figure 8A:
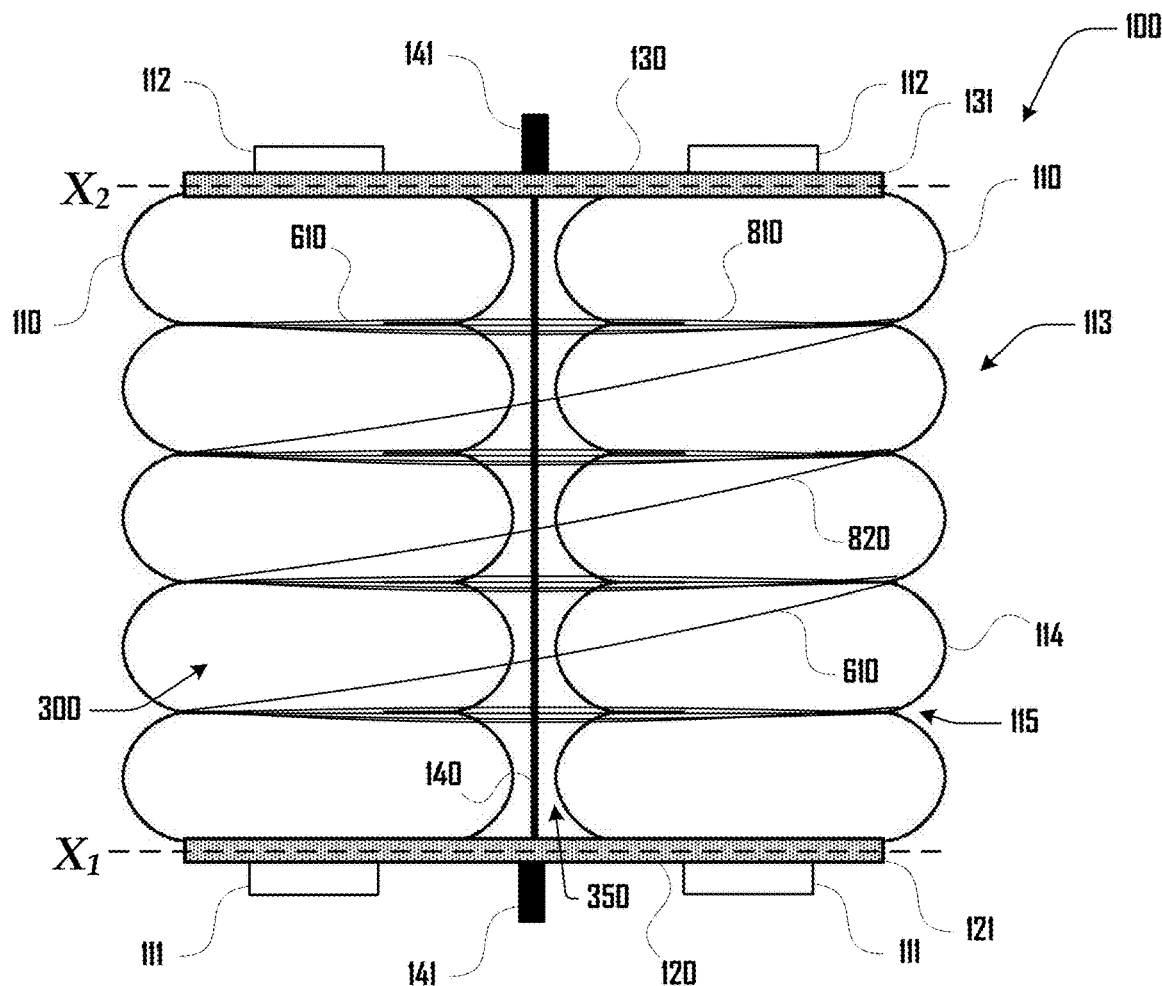
FIG. 8a is a side view of an actuator having a line surrounding bellows with the line surrounding a perimeter of the bellows and residing within respective valleys of the bellows.

FIG. 7 illustrates a line 610 reinforcing and/or constraining four bellows 110 of an actuator 100 with the line 610 surrounding a perimeter of the bellows 110 and residing within respective valleys 115 of the bellows 110. Similarly, FIG. 8a is a side view of an actuator 100 having a line 610 surrounding bellows 110 with the line 610 surrounding a perimeter of the bellows 110 and residing within respective valleys 115 of the bellows 110. The line 610 is shown wrapping around a respective parallel set of valleys 115 a plurality of times to form a wrap 810, and then extending to an adjacent set of parallel valleys 115 via runners 820.

In the examples of FIGS. 7b and 8a, the line 610 resides within valleys 115 that are generally parallel, but in further examples, the line 610 can reside within valleys 115 in a non-parallel configuration. Additionally, such wrapping configurations can be applied to actuators 100 having any suitable plurality bellows 100. Also wrapping portions 820 can comprise a plurality of wrappings of the line 610 as shown in FIG. 8a; can include a single winding as shown in FIG. 7; or can include a combination thereof.

Figure 8B:
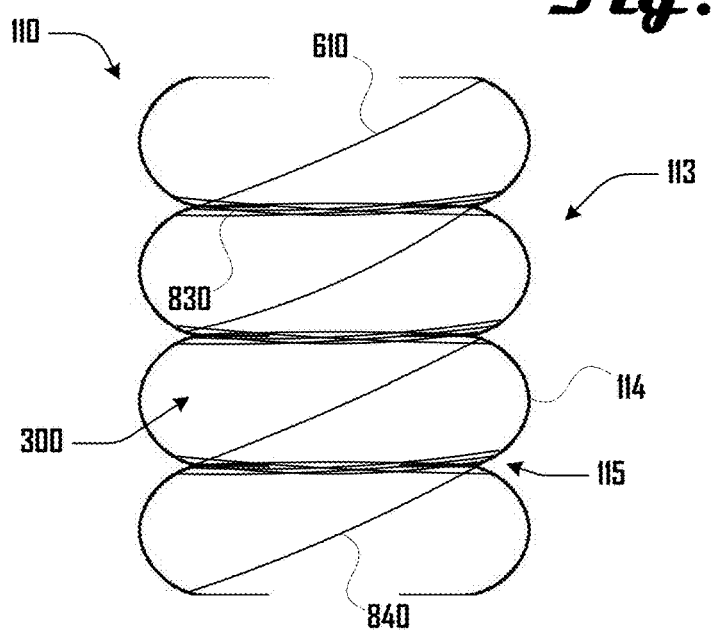
FIG. 8b illustrates a side view of a bellows having a continuous line wrapped around successive valleys of convolutions of the bellows with multiple wrappings in each valley generating a wrap and then extending to an adjacent valley via runners.

FIG. 8b illustrates a side view of a bellows 110 having a continuous line 610 wrapped around successive valleys 115 of convolutions 113 of the bellows 110 with multiple wrappings in each valley 115 generating a wrap 830 and then extending to an adjacent valley 115 via runners 840.

The line configurations of FIGS. 6a, 6b, 7, 8a and 8b can be present in a plurality of valleys 115 along the length of the bellows 110, which can include all valleys 115, every other valley 115, or other suitable arrangement. Additionally, wrapping can be done such that each convolution is reinforced with a separate line 610 or using a continuous line 610 where the line 610 straddles the outer convolution 114 to reach the adjoining inner convolution 115, as shown in FIGS. 8a and 8b. The line wrapping may be done in various suitable ways, including via a winding machine or other high volume manufacturing technique.

Each inner convolution 115 can suitably be wrapped once or with multiple wraps depending on the line 610 selected, the bellows design, and the target pressure capacity. The loops of line 610 can be terminated utilizing a variety of suitable methods including crimping, knotting, gluing, or the like. Additionally, the loops of line 610 can be glued or adhered with resin along the entire length of the line 610 or along suitable portions of the line 610. High strength, low stretch fibers and fabrics that may be used to reinforce and/or constrain the convolutions 113 include spectra, carbon fiber, Kevlar, metal wire, and the like.

In various embodiments, constraint of the bellows 110 to the ribs 150 may be done in a variety of suitable ways including through the use of high-strength, high-stiffness fibers, fabric, loops, or clips. These mechanisms can interface directly with the ribs 150 or can radially tie the multiple bellows 110 of an actuator together, such that in addition to the ribs 150, the bellows 110 cannot move radially relative to the spine 140.

In some embodiments, convolutions 113 can be constrained directly to the spine 140. For example, a clip or line 610 (e.g., as shown in FIG. 6a) can be used to tie the bellows 110 directly to the rib 150. In another example, (e.g., as shown in FIG. 6b) the line 610 constrains the convolution 113 to the actuator spine 140. In a further example, (e.g., as shown in FIG. 7) a line 610 wraps around four bellows 110 and the rib 150 and spine 140 to dictate the relative position of the bellows 110.

The wrapping of lines 610 can be terminated in a variety of suitable ways including but not limited to crimps, glue, resin, knots, notches in the ribs 150, or the like. High strength clips can be provided which lock into the rib 150 using hooks, snaps, or other suitable mechanisms. The bellows 110 can be constrained to the ribs 150, the spine 140, or to each other at every convolution valley 115 or only at some of the convolution valleys 115.

In some embodiments of the actuator 100, the bellows 110 are constrained to the spine 140 and relative to each other by using a single line 610. For example, a high-strength, low-stretch line 610 can be wrapped once or multiple times around the inner convolution 115 of the set of bellows 110 then the line 610 transverses one or multiple outer convolutions 114 to reach the next inner convolution 115. The wrapping may be done at every convolution valley 115 or it may skip convolutions. The traversing of the outer convolution 114 can be done across a single bellows 110 or from one bellows 110 to another. Such a wrapping configuration can be applied to actuators 100 that have or are without ribs 150. For example, FIG. 8a illustrates an example embodiment of such wrapping applied to an actuator 100 that does not have ribs 150.

The line 610 can be terminated in a variety of suitable ways including but not limited to knots, glue, resin, crimping, tying to the end plates, a friction mechanism, and the like. Additionally, in various embodiments, lines 610 can be impregnated with resin, glue, or the like, before or after wrapping such that a form of lap-joint is created between the convolution wraps.

In various embodiments, it can be desirable for an actuator 100 to comprise mechanical damping structures. For example, FIGS. 9a, 9b, 10a and 10b illustrate example embodiments of actuators 100 and bellows 110 that comprise or are associated with foam 900 that acts as a mechanical damping structure.

Figure 9A:
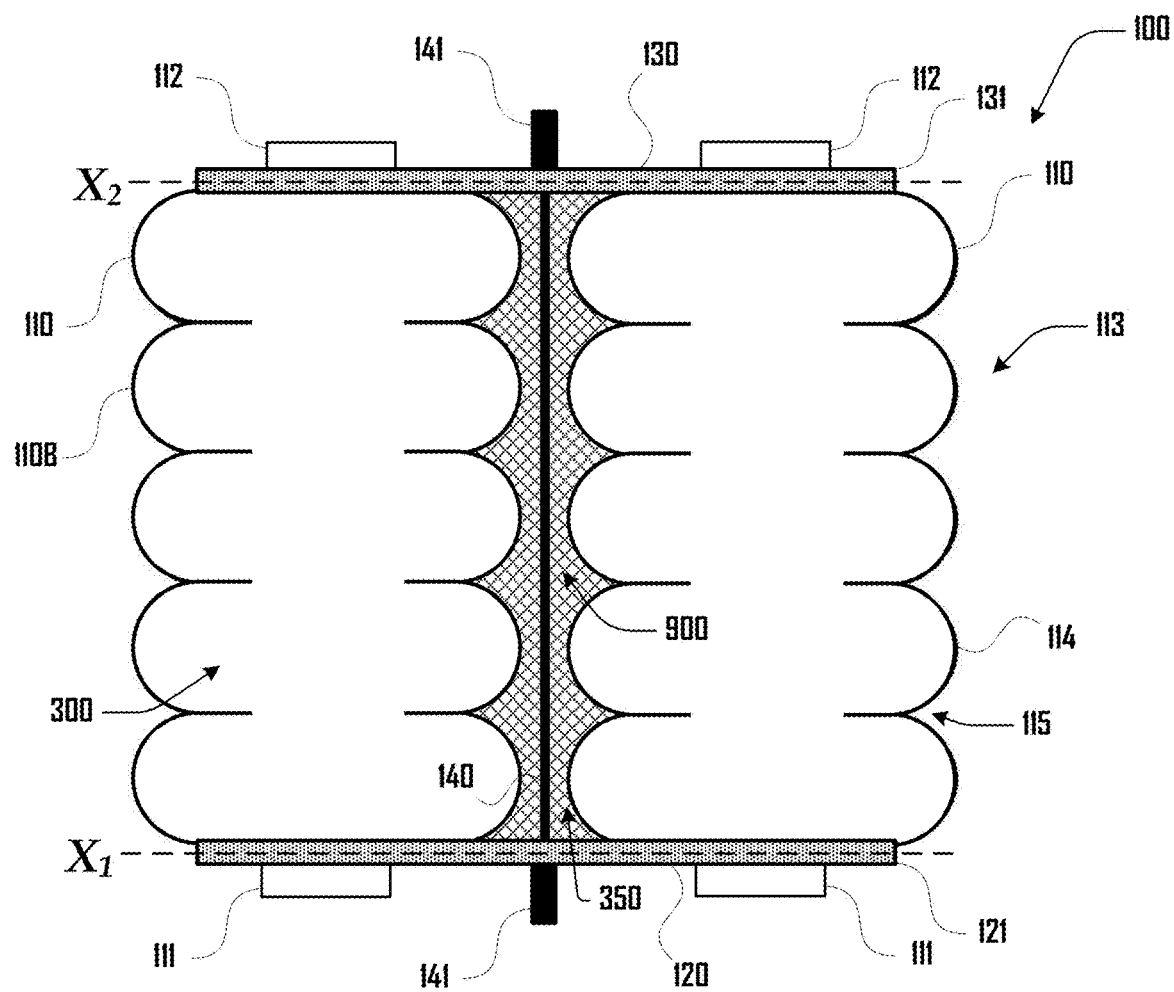
FIG. 9a illustrates one embodiment of an actuator that comprises foam disposed within the cavity between bellows and engaging the convolutions, including the peaks and valleys.

FIG. 9a illustrates one embodiment of an actuator 100 that comprises foam 900 disposed within the cavity 350 between bellows 110 and engaging the convolutions 113, including the peaks 114 and valleys 115. The foam 900 can be shaped for conform with the contours of the convolutions 113 of the bellows 110, but in some embodiments a cuboid or other shape of foam can be used, which can confirm to the contours of the convolutions 113 of the bellows 110 based on deformation of the foam 900 that occurs when engaging the bellows 100. In some embodiments, the foam 900 can be configured to only partially engage the convolutions 113. For example, the foam 900 may not extend into the valleys 115

FIG. 9a illustrates a side view of an actuator 100 comprising two bellows 110, but it should be clear that further embodiments can include any suitable plurality of bellows 110 with foam 900 disposed within a cavity 350 between the bellows 110. Additionally, while the example of FIG. 9a is shown without ribs 150 (e.g., as shown in FIG. 3), further embodiments can include foam 900 disposed between or about one or more ribs 150. Such embodiments can include separate pieces of foam 900 between ribs 150, or foam extending between ribs 150.

FIG. 9 also illustrates an embodiment having foam 900 extending contiguously between the plates 120, 130 within the cavity 350 between bellows 110. However, in some embodiments, foam 900 does not extend contiguously between the plates 120, 130 within the cavity 350 between bellows 110. For example, foam 900 can extend within a central portion of the cavity 350 but without engaging one or both of the plates 120, 130. Alternatively, foam 900 can be present engaging one or both of the plates 120, 130 and without foam 900 present in at least one central portion within the cavity 350 between the plates 120, 130.

In various embodiments, the foam 900 can be centrally disposed within the cavity 350 between bellows 110. In embodiments having four bellows 110 in a square arrangement (e.g., as in FIGS. 1, 2 and 5a), the foam 900 can extend radially from the spine 140 at various suitable lengths or radii from the spine 140. For example, the foam 900 can be confined within, extend to, or extend past a plane coincident with a pair of central axes X of the bellows 110 (e.g., $X_1$-$X_2$ or $X_2$-$X_3$ as shown in FIG. 2) or a plane that is tangential to an outer face of a pair of bellows 110 (e.g., $X_1$-$X_2$ or $X_2$-$X_3$ as shown in FIG. 2).

Figure 9B:
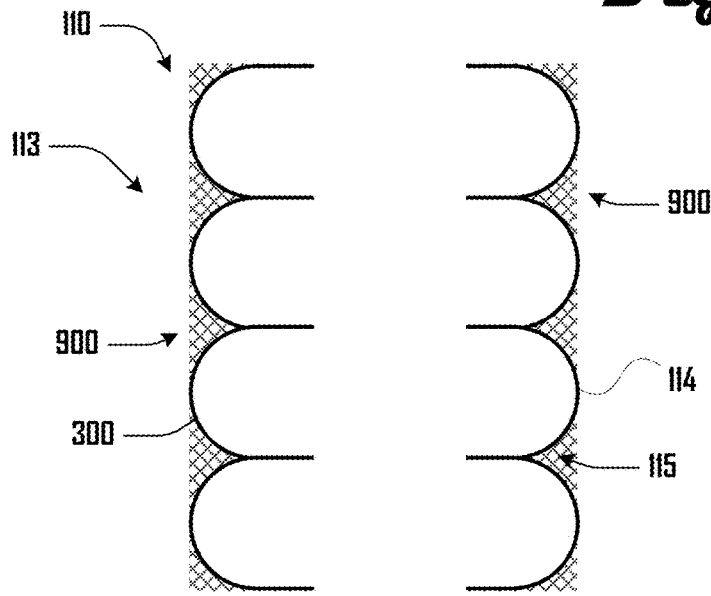
FIG. 9b illustrates a side cross sectional view of a bellows with foam disposed within the valleys of the convolutions of the bellows.

FIG. 9b illustrates a side cross sectional view of a bellows 110 with foam 900 disposed within the valleys 115 of the convolutions 113 of the bellows 110 on opposing sides of the bellows 110. For example, in various embodiments, one or more bellows 110 can have a plurality of ring-shaped foam members that surround the bellows 110 within the valleys 115 of the convolutions 113. In further embodiments, bellows 110 can be wrapped in a sheet of foam 900 along a length of the bellows 110; the bellows 110 can be disposed within a shaft of an open cylinder defined by foam 900, or the like.

Figure 10A:
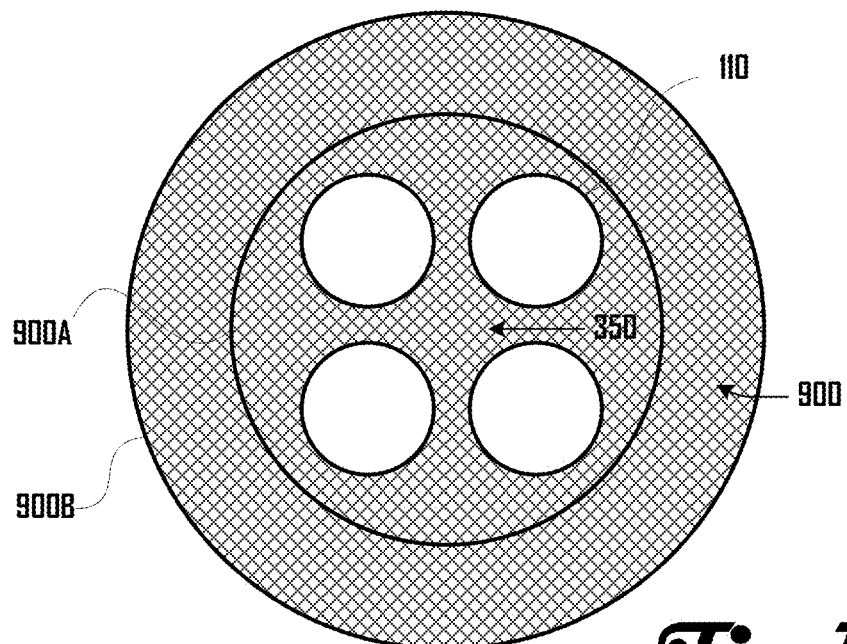
FIG. 10a illustrates an embodiment of an actuator comprising four bellows disposed within a first foam portion, which is further surrounded by a second foam portion.

In further embodiments, a one or more bellows 110 can be surrounded by a plurality of layers of foam 900. In one example, FIG. 10a illustrates an embodiment of an actuator 100 comprising four bellows 110 disposed within a first foam portion 900A, which is further surrounded by a second foam portion 900B. Such first and second portions 900A, 900B can be various suitable shapes and sizes as desired.

Figure 10B:
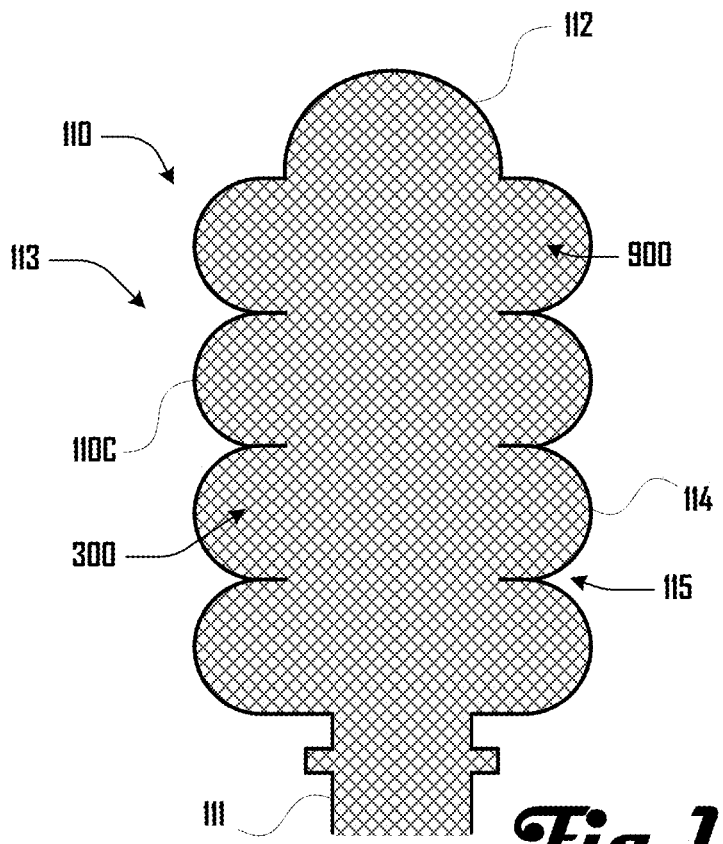
FIG. 10b illustrates a bellows being completely filled with foam from the first and second end.

In further embodiments, foam 900 can be disposed within the internal cavity 300 of a bellows 110. For example, FIG. 10b illustrates a bellows 110 being completely filled with foam 900 from the first and second end 111, 112. However, in further embodiments, less than the entire volume of the internal cavity 300 of the bellows 110 can be filled.

In some embodiments, such foam 900 can comprise energy dissipating flexible foam, memory foam, spray foam, foam pellets, foam chunks, or the like. The foam 900 can comprise open or closed-cell foam 900. Additionally, in some embodiments, foam can be selected and optimized to have a fast or slow response.

As the angle of the actuator 100 changes, the foam 900 can be compressed and/or decompressed, which can affect the dampening generated by the foam 900. In various embodiments, the damping mechanism of the foam 900 can be through the restriction of airflow through the pores of open cell foam, by the deformation of the material structure, or the like. Foam 900 can be introduced into the actuator 100 by layering pieces of foam 900 during assembly, filling the bellows 110 with pieces of foam 900, using pourable foam 900 inside or outside of the bellows 110, molding foam 900 over a completed assembly, and the like. When the foam 900 is added to the internal cavity 300 of the bellows 110, channels can be formed or otherwise be present in the foam 900 to facilitate the flow of air into the bellows 110.

Additionally, foam 900 can be shaped to allow for the spine 140, electrical cables, fluid lines and other components to traverse the center of the actuator 100. Accordingly, various embodiments can comprise foam having suitable channels, cavities, or openings that allow for such elements to extend through the foam 900.

While damping via foam 900 is one preferred method, and other suitable damping methods or structures can be used in accordance with further embodiments. For example, suitable damping mechanisms can comprise coulomb damping, viscous damping, and the like. In one embodiment, a dashpot can be added in parallel to the bellows 110 between the top plates 120, 130 or the ribs 150 to add damping into the actuator 100. In another embodiment, a spring can be disposed in parallel with bellows 110 to increase the stiffness of the actuator 100. The spring may act as a restoring force that returns the plates 120, 130 to a set angle (e.g., a neutral configuration). Additionally, a plurality of damping mechanisms can be used in conjunction to achieve a desired damping.

Although some specific embodiments of bellows 110 are shown herein, various suitable bellows 110 can be employed in accordance with further embodiments. For example, bellow parameters that can be suitably modified or configured in various embodiments include inner and outer diameters, convolution height, number of convolutions 113, overall length of the bellows 110, interfaces may be tuned to change the resolution of the actuator 100, range of motion, force, torque, stiffness, damping, mass of the actuator 100, and the like.

Figure 11A:
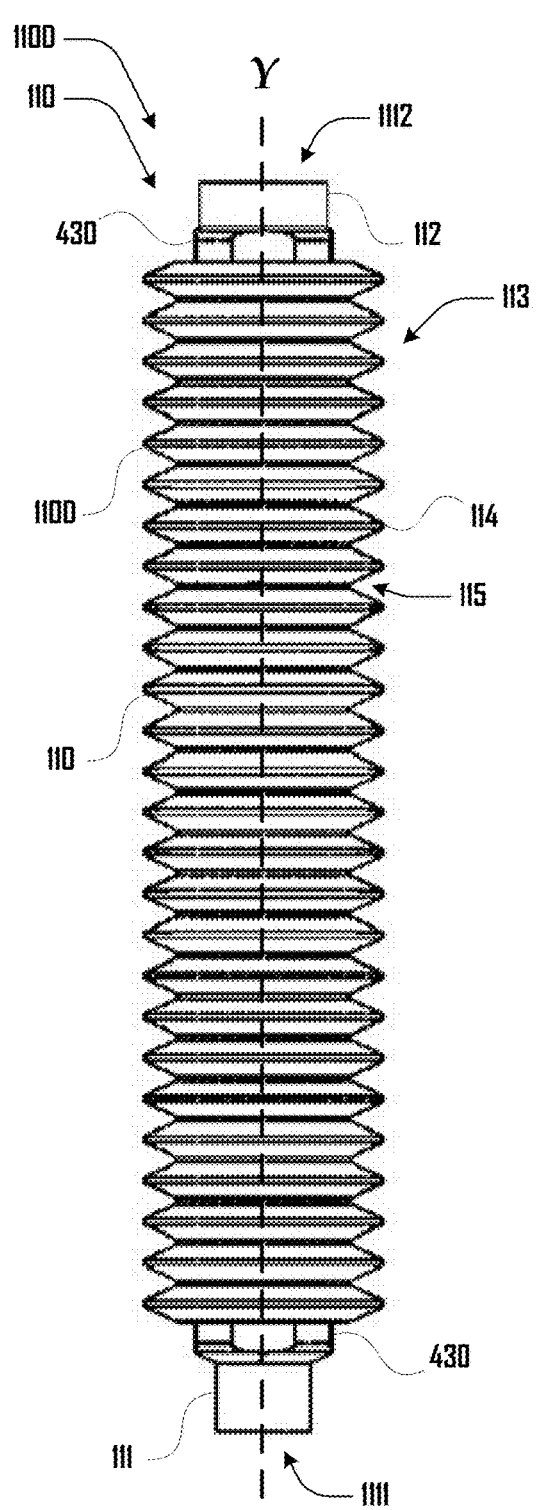
FIG. 11a illustrates an example embodiment of a bellows comprising ports disposed at the first and second ends respectively.
Figure 11B:
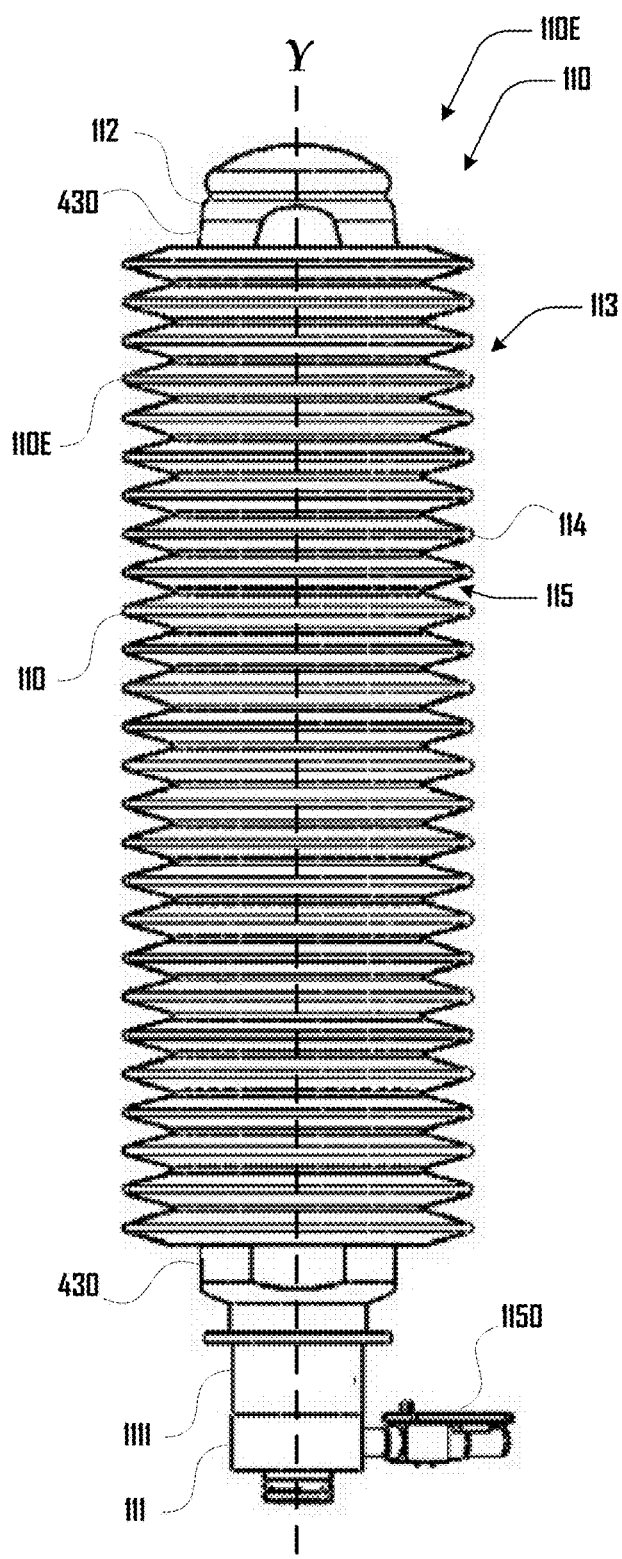
FIG. 11b illustrates another embodiment of a bellows that includes a port on the first end of the bellows, with the second end being closed or otherwise terminating without a port structure.

The bellows 110 can have one or more openings or ports that may be used as inlets and/or outlets for fluid into or out of the internal cavity 300 of the bellows 110; as ports for pressure sensors or other type of sensors; as mechanical interfaces, and the like. For example FIG. 11a illustrates an example embodiment 110D of a bellows 110 comprising ports 1111, 1112 disposed at the first and second ends 111, 112 respectively. In contrast, FIG. 11b illustrates another embodiment 110E of a bellows 110 that includes a port 1111 on the first end 111 of the bellows 110, with the second end 112 being closed or otherwise terminating without a port structure.

In various embodiments, valves can be mounted proximate to or directly on one or more ports 1111, 1112 to reduce the distance the pressure wave must travel and therefore decrease response time of the actuator 100. In embodiments having ports 1111, 1112 on the first and second ends 111, 112 an inlet valve may be mounted at the first port 1111 of the first end 111 and an outlet valve can be mounted on the second port 1112 of the second end 112. In some embodiments, portions of a valve can be mounted inside of the bellows 110. Valves can interface directly with the bellows 110 through a manifold, tubing, or the like. The ports 1111, 1112 can comprise coupling structures such as threads or other features that facilitate interfacing to other components.

In various embodiments, the fluid pressure in the internal cavities 300 of the bellows 110 can be monitored using a pressure sensor. For example, FIG. 11b illustrates an example embodiment 110E of a bellows 110 having a pressure sensor 1150 mounted at the opening 1111 of the bellows 110. In further embodiments, a pressure sensor can be disposed in various suitable locations on or about a bellows 110 including directly at an opening 1111, 1112 of the bellows 110; on the end of the bellows 110 opposite to a valve inlet; on a manifold that is attached to the bellows 110, off a tee, inside the bellows 110 (e.g., using an absolute pressure sensor), or the like. In another embodiment, the pressure in the actuator 100 as a whole, or of one or more bellows 110, can be sensed by measuring the difference in pressure between two or more bellows 110 of the actuator 100. Some embodiments can comprise a plurality of pressure sensors associated with a given bellows 110, which can be desirable for safety, reliability, and the like.

By selectively inflating and or deflating the respective bellows 110 of an actuator 100, the position of the plates 120, 130 can move relative to each other. In other words, the pressure or volume of the bellows 110 of an actuator 100 can be controlled to achieve force, torque, position, movement, angle, or displacement of the actuator 100 or portions thereof. Fluid can be introduced and/or removed from the bellows 110 to actuate the actuator 100 and such fluid can comprise air, water or any other suitable gas or liquid.

Figure 12A:
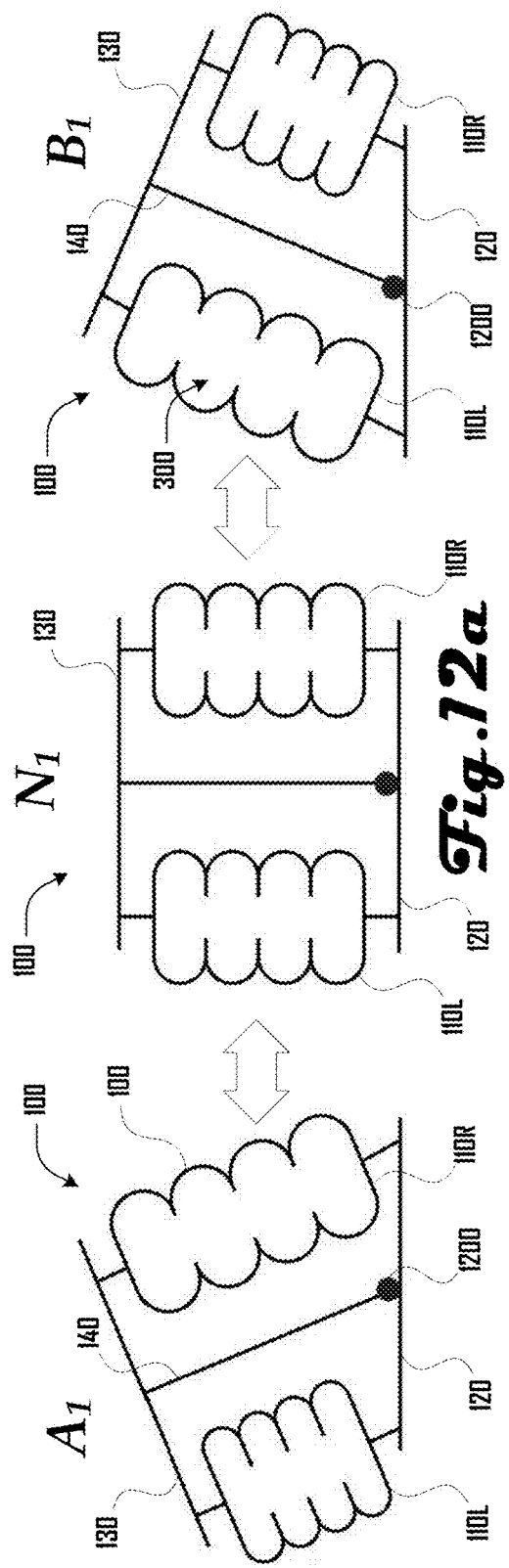
FIGS. 12a and 12b illustrate two example embodiments of an actuator moving between three different example configurations based on inflation and/or deflation of a left and right bellows of the actuator.
Figure 12B:
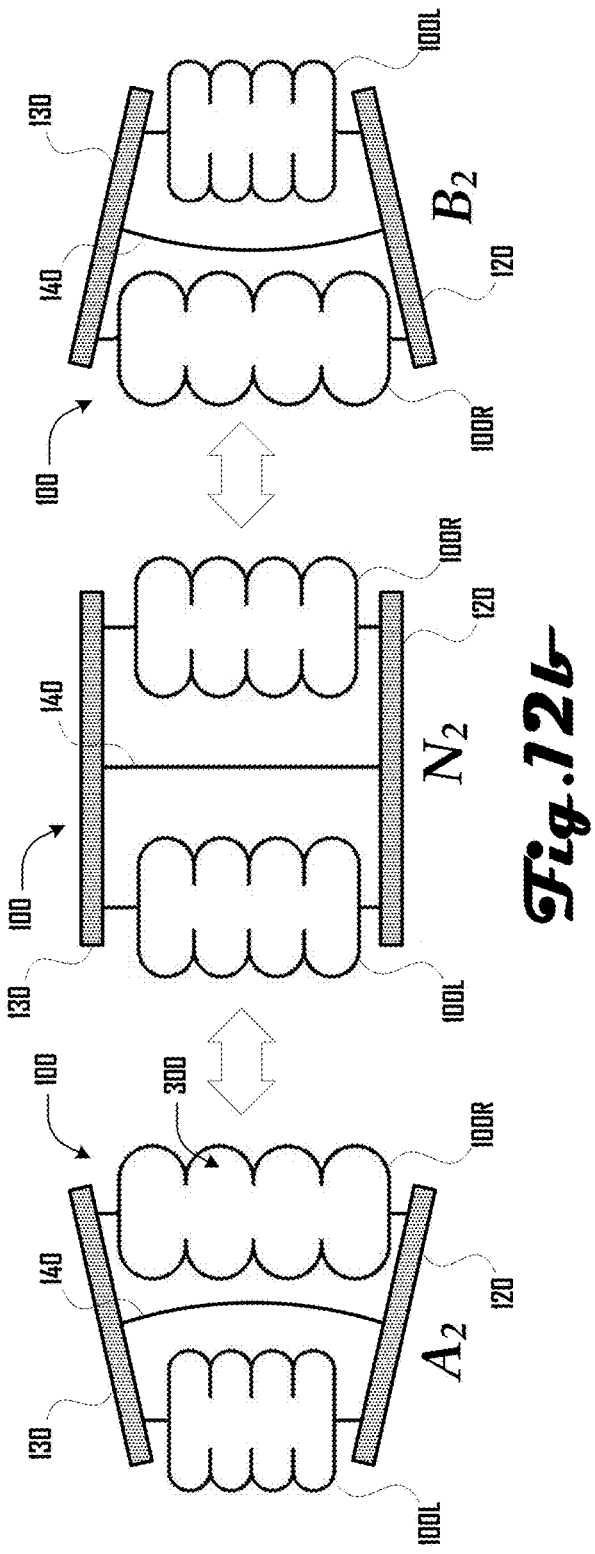

FIGS. 12a and 12b illustrate two example embodiments of an actuator 100 moving between three different example configurations based on inflation and/or deflation of a left and right bellows 110L, 110R of the actuator 100. FIG. 12a illustrates an actuator 100 a left and right bellows 110L, 110R disposed between and extending between plates 120, 130. A stem 140 is also coupled to the plates 120, 130 and extends between the plates 120, 130 between the bellows 100L, 100L. In the example of FIG. 12a, the stem 140 is rotatably coupled to the first plate 120 via a joint 1200.

The actuator can assume a neutral configuration $N_1$, wherein the bellows 110L, 110R are the same length with the plates 120, 130 being parallel, and a central axis of the bellows 110L, 110R extending perpendicular to the plates 120, 130. From the neutral configuration $N_1$, the actuator 100 can assume tilted configurations $A_1$, $B_1$ by changing the lengths of the bellows 110L, 110R. For example, shortening the length of left bellows 110L and expanding the length of the right bellows 100R can generate tilted configuration $A_1$. Shortening the length of right bellows 110R and expanding the length of the left bellows 110L can generate tilted configuration $B_1$. Additionally, in various embodiments, the bellows 110 can be configured to change length without changing diameter. In other words, the bellows 110 can be configured to expand and contract along the length of the bellows 110, but are configured to not substantially expand or contract in diameter during such expansion or contraction.

Such lengthening and shortening of the bellows 110L, 110R can be generated by modifying a fluid pressure and/or volume of fluid within the internal cavity 300 of the bellows 110L, 110R. For example, fluid can be removed from the internal cavity 300 and/or the fluid pressure the internal cavity 300 can be reduced to generate shortening of the bellows 110. For example, fluid can be introduced to the internal cavity 300 and/or the fluid pressure of the internal cavity 300 can be increased to generate lengthening of the bellows 110.

Additionally, while some actuation positions (e.g., $A_1$, $B_1$) can be generated by respectively lengthening and shortening opposing bellows 110L, 110R, in further embodiments, actuation positions can be generated by only lengthening or shortening one of the bellows 110, while leaving an opposing bellows 110 of the same length. Also, in some embodiments actuation positions can be generated by changing the fluid pressure of only one of the bellows 110 of an actuator. Additionally, in some embodiments, lengthening or shortening of a bellows 110 can occur as a result of being pulled or pushed by the plates 120, 130 (e.g., where the plates 120, 130 are pushed or pulled by an opposing bellows 110) and not as a result the system directly modifying the fluid pressure and/or volume of fluid within the internal cavity 300.

FIG. 12 illustrates one example embodiment, where the spine 140 pivots or rotates about a joint 1200 such that the spine 140 remains linear in various actuation states (e.g., $A_1$, $B_1$, $N_1$). However, in further embodiments, and as illustrated in FIG. 12b, the spine 140 can be configured to bend or curve in some actuation states (e.g., $A_2$, $B_2$) and be linear in a neutral actuation state $N_2$. Such embodiments can be desirable because such deformation of the spine 140 can act to bias the plates 120, 130 toward the neutral position $N_2$.

While the bellows 110L, 110R of examples of FIGS. 12a, 12b are shown maintaining a substantially linear central axis, in further embodiments, the bellows 110 can bend, curve or otherwise deform within the actuator 100, which in some embodiments can include a bend being similar to the bend of the spine 140 illustrated in FIG. 12b.

Additionally, while an actuator 100 having two bellows 110L, 110R is shown in FIGS. 12a and 12b, it should be clear that such actuation methods can be applied to actuators 100 having any suitable plurality of bellows 110 and to generate actuation of the plates 120, 130 with two degrees of freedom. For example, where an actuator 100 comprises four bellows 110 in a square arrangement (e.g., as shown in FIGS. 1 and 2), selective introducing and/or removing fluid from one or more of the bellows 110 can generate motion of the plates 120, 130 having two degrees of freedom.

Measuring the position or configuration of the actuator 100 can be desirable in various embodiments for controlling movement of the actuator 100. For example, one or more joint angles of the actuator 100 (i.e., the angle or position of the plates 120, 130 relative to each other) can be sensed, measured or estimated with various suitable sensors including inclinometers, inertial measurement units, and the like.

Figure 13A:
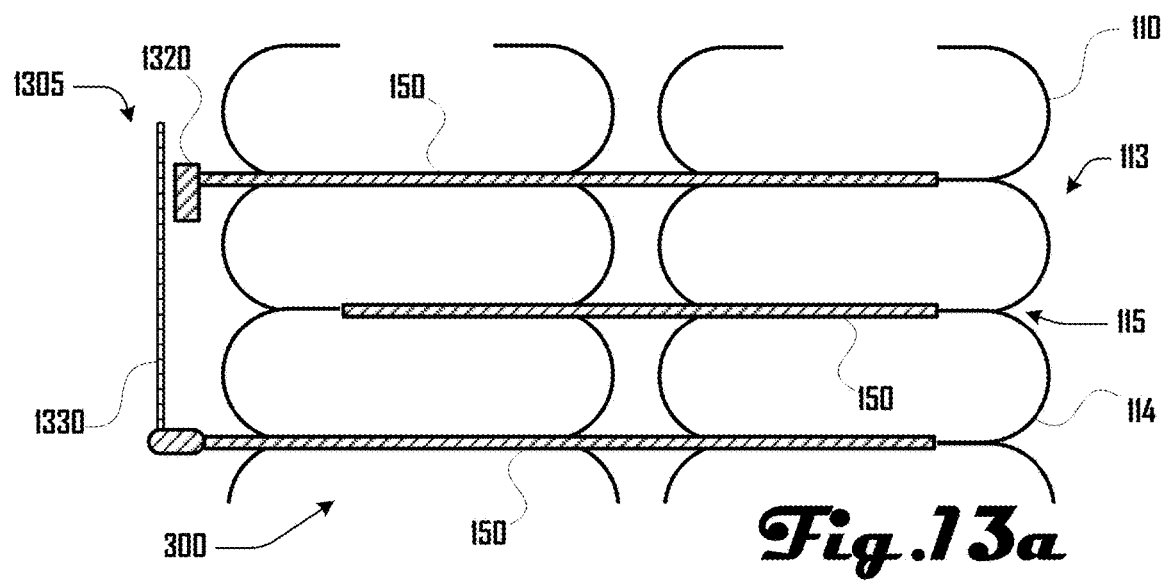
FIG. 13a illustrates one example embodiment of a sensing mechanism where an encoder assembly is used to measure the distance or angle between the ribs or convolutions of the bellows in a first plane.

FIG. 13*a* illustrates one example embodiment of a sensing mechanism where an encoder assembly 1305 is used to measure the distance or angle between the ribs 150 or convolutions 113 of the bellows 110 in a first plane. The encoder assembly 1305 is shown comprising an encoder head 1320 coupled at a distal end of a first rib 150, which faces an encoder strip 1330 that is coupled to a second rib 150. The encoder strip 1330 extends along an external face of a bellows 110, and in the configuration of FIG. 13*a*, is shown extending parallel to a central axis of the bellows 110.

As the bellows 110 extend, contract, or bend as described herein, the position of the encoder head 1320 relative to encoder strip 1330 can change, which can indicate a distance between the first and second rib on which the encoder strip 1330 and encoder head 1320 are respectively disposed, which can be used to calculate a joint angle in one plane of the actuator 100.

For example, in one embodiment, such a distance measurement generated by the encoder assembly 1305 can enable the estimation of a first joint angle in a first plane. In various embodiments, the number of ribs 150 spanned by the sensor assembly can be any suitable number from one to all of the ribs 150 of an actuator 100. Additionally, in some embodiments, the encoder strip 1330 and/or read head 1320 can be mounted with a mechanism that is designed to constrain only one degree of freedom such that only the normal motion between the ribs 150 is captured by the encoder mechanism 1305.

Such embodiments can be desirable for multiple degree-of-freedom actuators 10 where the angle of the ribs 150 can change about two axes. Accordingly, in various embodiments, a plurality of encoder mechanisms 1305 can be used to capture the separate degrees of freedom of an actuator. For example, in some embodiments, encoder mechanisms 1305 can be disposed perpendicularly and/or on different sides of the actuator to sense actuator angles in a plurality of planes, including planes that are perpendicular.

Additionally, in some embodiments multiple encoder heads 1320 can be used along the axial length of the actuator 100 to capture higher order deflections of the spine 140 when it is desirable to model the shape or bend of the spine 140 The encoder 1320 can comprise any suitable type of sensor, including an optical encoder, magnetic encoder, and the like. Further embodiments can comprise a hall-effect sensor and a magnet to measure the distance between the ribs 150, bellows convolutions 113, end plates 120, 130, or the like. Measurements can also be made using other field-strength to distance sensors such as inductive sensors, capacitive sensors, and the like. The distance between the ribs 150 or convolutions 113 can also be measured using other suitable optical sensors including laser range finders, cameras that detect features on the ribs 150, and the like.

Another embodiment for measuring the shape, configuration or angle(s) of an actuator 100 is to capture the deflection of the spine 140. This can be done in a variety of ways including but not limited to bend sensors, strain sensors, distance sensors using electromagnetic fields, or fiber optic curvature sensors among others. These sensors can be located on or near the spine 140 to measure curvature, deflection, strain, or the like. In one embodiment, a fiber optic curvature sensor can be located within or parallel to the spine 140 and can be used to sense at one or more locations, in one or more axes of bending, the shape of the spine 140 so that the shape of the spine 140 can be reconstructed, estimated or sensed from the curvature readings. These sensors can be desirable in some embodiments because they can be insensitive to external interference.

A further embodiment for measuring the angles of the actuator 100 is to measure the length from endplate 120 to endplate 130 at a radius away from a center axis of the actuator 100. This can be done with a variety of distance measurement sensors, including but not limited to string potentiometers, acoustic ranging devices, optical ranging devices, linear encoders, and the like. Cameras may be used to capture features on the end plates 120, 130 or ribs 150 in some embodiments. The size and location of the features as captured by the cameras can be used to estimate the distance between plates 120, 130 and as a result the joint angle of the actuator 100. This technique may be implemented with more than one sensor as described herein to capture more than one degree of freedom of motion and/or to provide redundant measurements.

Figure 13B:
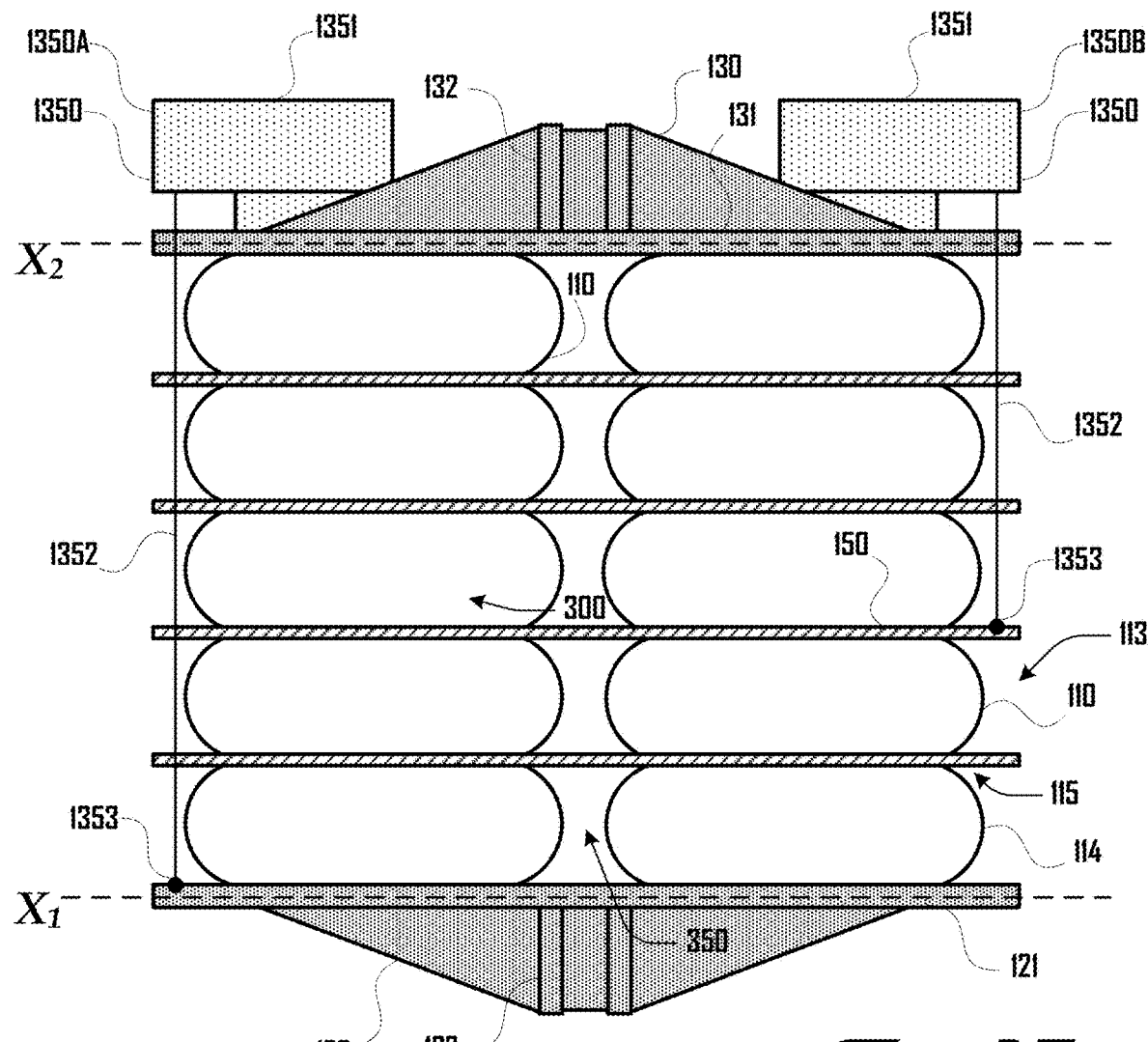
FIG. 13b illustrates an example embodiment of an actuator that utilizes sensor assemblies comprising string encoders, string potentiometers, or the like, to capture the distance between the two end plates.

FIG. 13*b* illustrates an example embodiment of an actuator 100 that utilizes sensor assemblies 1350 comprising string encoders, string potentiometers, or the like, to capture the distance between the two end plates 120, 130 or the distance between two components such as the ribs 150, plates 120, 130, or the like. In this example, a first sensor assembly 1350A comprises a housing 1351 disposed on the second plate 130 with a sensor line 1352 that extends from the housing 1351 and is coupled to the first plate 120 at an anchor point 1353. A second sensor assembly 1350B comprises a housing 1351 disposed on an opposing side of the second plate 130 with a sensor line 1352 that extends from the housing 1351 and is coupled to a rib 150 120 at an anchor point 1353.

For example, in such embodiments, distance between the plates 120, 130 or between the second plate 130 and a rib 150 can be measured using a sensor assembly 1350 (e.g., comprising a string encoder or string potentiometer) where the count or resistance changes as the sensing line 1352 coils and uncoils.

In various embodiments, a plurality of separate sensor assemblies 1350 can be used to capture two degrees of freedom of the actuator 100 as described herein. As shown in FIG. 13*b*, the sensing line 1352 can be coupled to a plate 120 or rib 150, but in further embodiments, the sensing line 1352 can be coupled to other suitable portions of an actuator 100, including any suitable portion of the convolutions 113 of the bellows 110. By capturing the length of the joint at different points (e.g., as shown in FIG. 13*b*) higher order deformation modes can be measured in some embodiments. Such configurations can also allow for multiple measurements of the joint angle which can give more accurate results and provide redundancy in the case of failures. However, in further embodiments, an actuator can comprise only a single sensor assembly 1350 or comprise a plurality of sensor assemblies 1350 with the sensing line 1352 coupled to different portions of the same piece of the actuator 100.

As discussed herein, actuators can comprise any suitable plurality of bellows 110 in accordance with various embodiments. For example, some embodiments can include four bellows 110 in a square arrangement (e.g., as shown in FIGS. 1 and 2) or can comprise two bellows 110 side-by-side (e.g., as shown in FIGS. 12*a* and 12*b*). However, it should be noted that side-view illustrations of actuators 100 herein that depict a first and second bellows 110 can also be a depiction of various embodiments of actuators 100 having more than three bellows 110. For example, such side-view illustrations where two bellows 110 are shown can be obscuring one or more additional pairs of bellows 110 behind the illustrated pair of bellows 110. Additionally, such side-view illustrations where two bellows 110 are shown can be depicting a portion of an actuator 100 having three or more bellows.

Figure 15A:
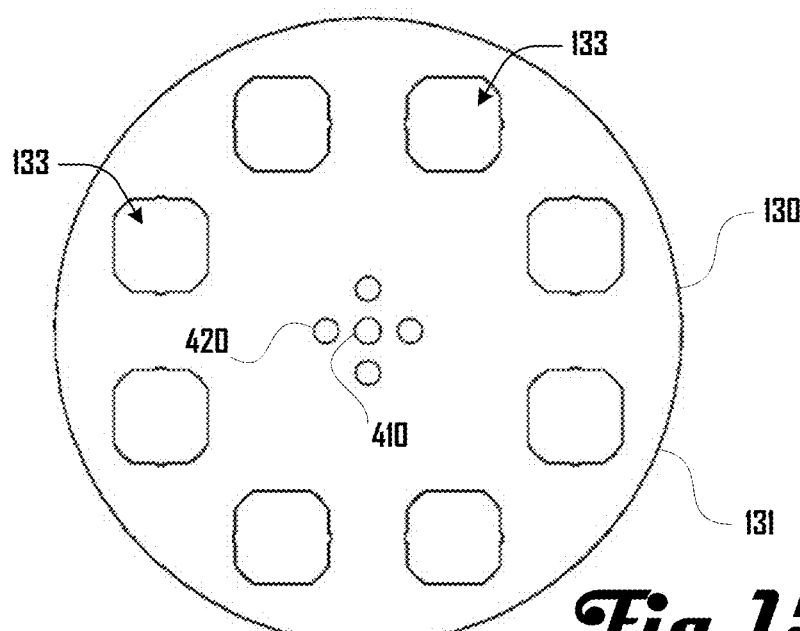
FIG. 15a illustrates a plate of the eight-bellows actuator of FIG. 14.

In various embodiments, bellows 110 of an actuator 100 can be arranged in a regular or irregular polygonal configuration, including a triangle, square (e.g., as shown in FIGS. 1 and 2), pentagon, hexagon, heptagon, octagon, nonagon, decagon, dodecagon, and the like. For example, FIG. 14 illustrates an example embodiment 100B of an actuator comprising eight bellows 110 in an octagonal configuration, and FIG. 15a illustrates a second plate 130 of such an embodiment 100B.

As shown in FIG. 14, the actuator 110 comprises eight bellows 110 (two being obscured in this illustration), which extend between a first and second plate 120, 130. The bellows 110 extend along parallel axes Y (e.g., $Y_1$, $Y_2$, $Y_3$, $Y_4$) between the plates 120, 130, which are respectively disposed at axis $X_1$ and $X_2$ that are perpendicular to the parallel axes Y of the bellows 110. As discussed herein, such a configuration of the actuator 100 can be called a "neutral" configuration. Such an embodiment 100B having eight bellows can be configured to actuate with two degrees of freedom.

As discussed herein, in various embodiments, the pressure and/or fluid volume of each of the bellows 110 can be individually controlled. However, in some embodiments, two or more bellows 110 can be controlled jointly. For example, in some implementations of the example embodiment 100B of an actuator 100 having eight bellows 110, adjacent pairs of bellows 110 can be controlled jointly. In other words, four pairs adjacent of bellows 110 can be separately inflated and/or deflated to generate actuation of the actuator 100. In such embodiments where a plurality of internal cavities 300 of the bellows 110 are fluidically connected, such a configuration can be desirable to reduce the number of valves and controllers of a given actuator 100 or associated system.

Various embodiments of actuators described and shown herein comprise plates 120, 130 that are substantially planar or comprise planar portions 121, 131 that engage with the ends 111, 112 of the bellows 110. However, in further embodiments such plates or ends can be non-planar. For example, FIG. 15b illustrates a side view of an example embodiment 100C of an actuator 100 comprising a pair of angled plates 1520, 1530 with a spine 1540 extending therebetween along an axis Y.

The first angled plate 1520 can be defined by a pair of arms 1521A, 1521B that extend from a central location where the spine 1540 is coupled, with the arms 1521A, 1521B defining an angle $\theta_1$ therebetween. A bridge 1523 can extend between the arms 1521A, 1521B to provide support for the arms 1521A, 1521B. Similarly, the second angled plate 1530 can be defined by a pair of arms 1531A, 1531B that extend from a central location where the spine 1540 is coupled, with the arms 1531A, 1531B defining an angle $\theta_2$ therebetween. A bridge 1523 can extend between the arms 1531A, 1531B to provide support for the arms 1531A, 1531B. In various embodiments, angles $\theta_1$ and $\theta_2$ can be the same and bisected by axis Y in a "neutral" configuration of the actuator 100C.

Figure 15B:
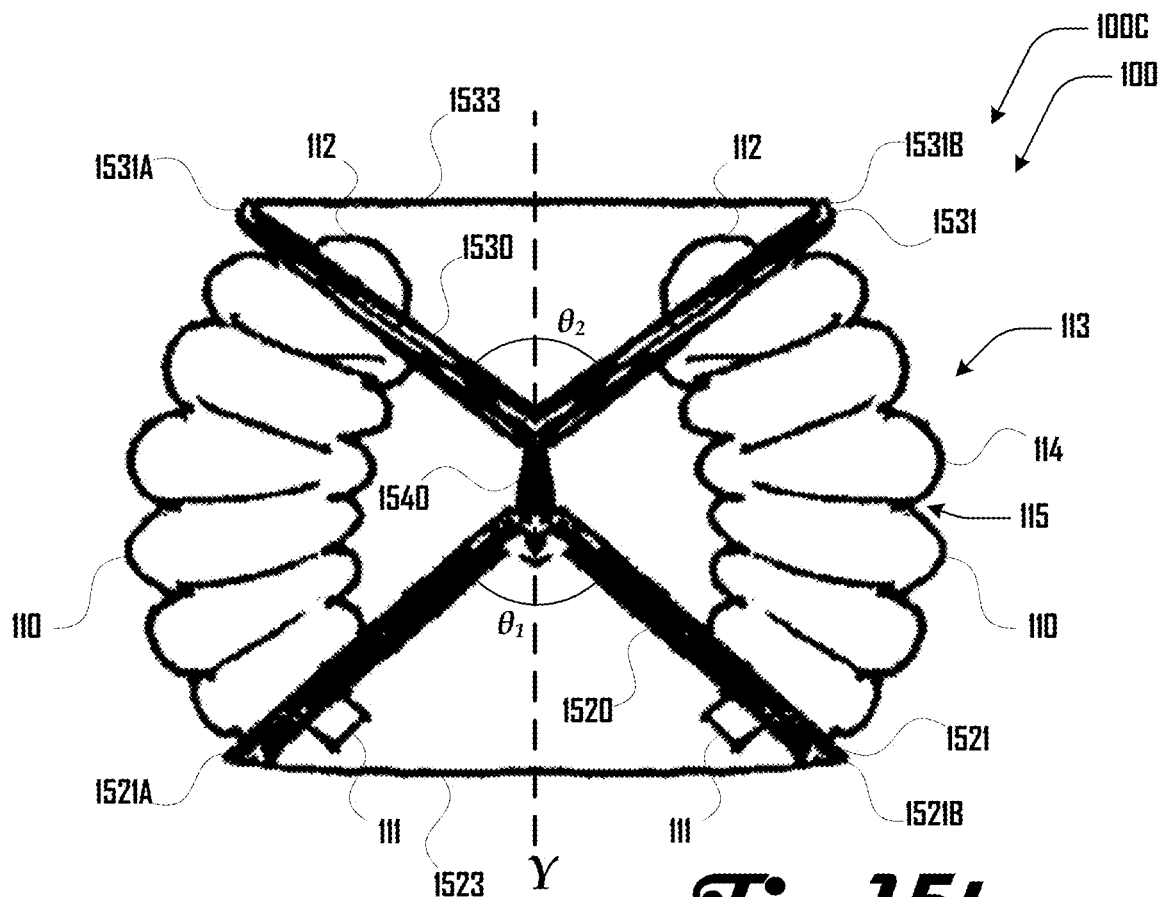
FIG. 15b illustrates an embodiment of the actuator where the plates are angled and the bellows are curved such that the ends of the bellows are parallel to the plate faces.

A pair of bellows 110 extend between and are coupled to respective arms 1521A, 1521B, 1531A, 1531B, and as shown in FIG. 15b, the bellows 110 can assume a configuration having a non-linear central axis while in a neutral configuration. More specifically, first ends 111 of the bellows 110 are respectively coupled to the first arms 1521A, 1521B and the second ends 112 of the bellow 110 are respectively coupled to the second arms 1531A, 1531B.

In various embodiments, such an angled configuration of the angled plates 1520, 1530 can be desirable because it can increase the moment arm relative to the spine 140 and decreases the axial load on the angled plates 1520, 1530. Further embodiments can comprise any suitable plurality of bellows 110 coupled to angled plates 1520, 1530 in various suitable arrangements with the angled plates 1520, 1530 being conical, a square pyramid, a tetrahedron, or the like. For example, as discussed herein, the example illustration of FIG. 15b can illustrate a portion of an actuator 100 comprising three or more bellows 110, including an example having four bellows 110 with two bellows 110 obscured behind the bellows 110 illustrated.

Figure 16A:
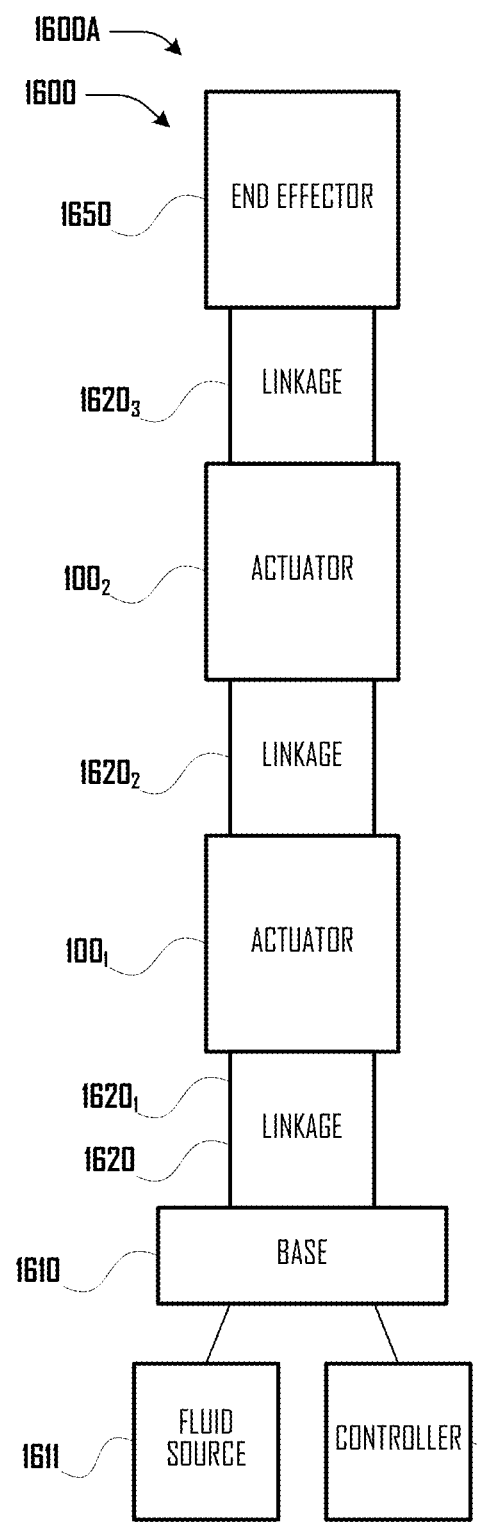
FIGS. 16a and 16b illustrate two example configurations of robotic manipulators that comprise a plurality of actuators disposed in parallel with linkages disposed between actuators.
Figure 16B:
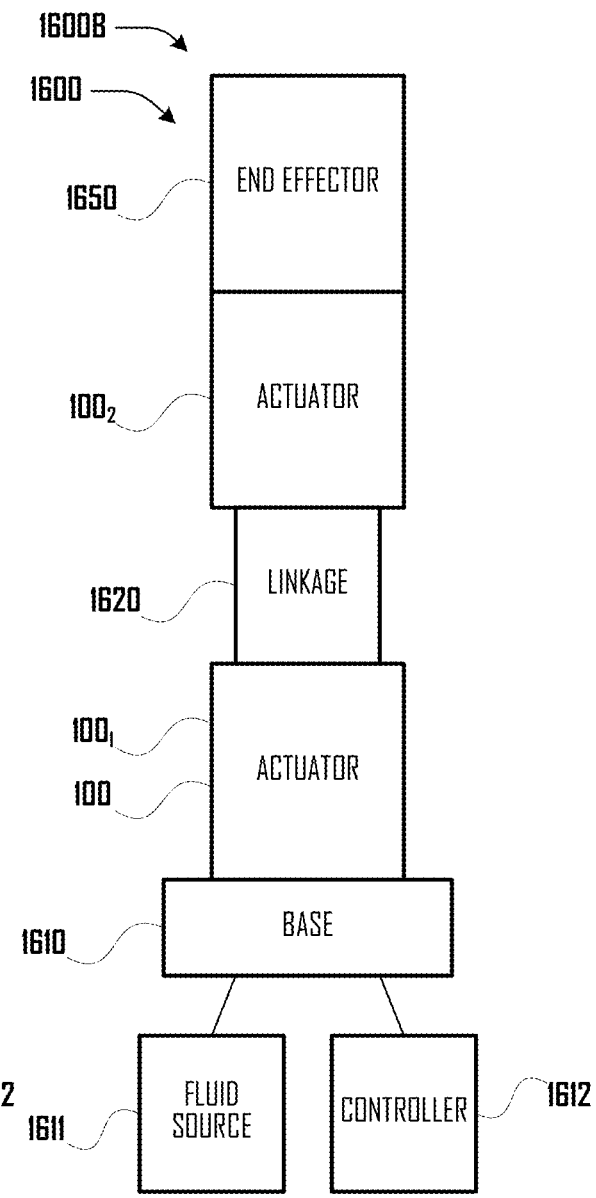

Various types of robotic manipulators can be constructed using actuators 100 by mounting the actuators 100 in series, parallel or as a combination. Such robotic actuators can be configured to have many degrees of freedom, including two, three, four, five, six, seven, eight, nine, ten or more. FIGS. 16a and 16b illustrate two example configurations 1600A, 1600B of robotic manipulators 1600 that comprise a plurality of actuators 100 disposed in series with linkages 1620 disposed between actuators 100. The actuators 100 and linkages 1620 extend from a base 1610 and can be operably coupled with a fluid source 1611 and controller 1612. As discussed herein, "downstream" refers to items in series farther from the base 1610 and "upstream" refers to items in series closer to the base 1610.

FIG. 16a illustrates an example embodiment 1600A of a robotic actuator 1600 comprising two actuators $100_1$, $100_2$, and three linkages $1620_1$, $1620_2$, $1620_3$ that extend downstream from a base 1610, with an end effector 1650 coupled at a distal end of the robotic actuator 1600. More specifically, a first linkage $1620_1$ is disposed downstream of the base 1610, with the first actuator $100_1$ downstream of the first linkage $1620_1$. A second linkage $1620_2$ is disposed downstream of the first actuator $100_1$, with a second actuator $100_2$ and third linkage $1620_3$ following successively thereafter. The end effector 1650 is shown coupled downstream of the third linkage $1620_3$.

Similarly, FIG. 16b illustrates an example embodiment 1600B of a robotic actuator 1600 comprising two actuators $100_1$, $100_2$, and one linkage 1620 that extend downstream from a base 1610, with an end effector 1650 coupled at a distal end of the robotic actuator 1600. More specifically, a first actuator $100_1$ is disposed downstream of the base 1610, with a second linkage $1620_2$ disposed downstream of the first actuator $100_1$, with a second actuator $100_2$ following successively thereafter. The end effector 1650 is shown coupled downstream of the second actuator $100_2$.

In various embodiments, the base 1610 can be various suitable structures, including a vehicle, mobile base, cart, lift mechanism, body of a robot, a housing, or the like. In other words, the base 1610 can include any suitable structure from which further portions of the robotic actuator 1600 can extend. Such a base 1610 can be disposed parallel to the ground with the robotic actuator 1600 extending vertically or in an elevated position extending toward the ground. The base 1610 can also be disposed in various other suitable orientations.

Figure 17:
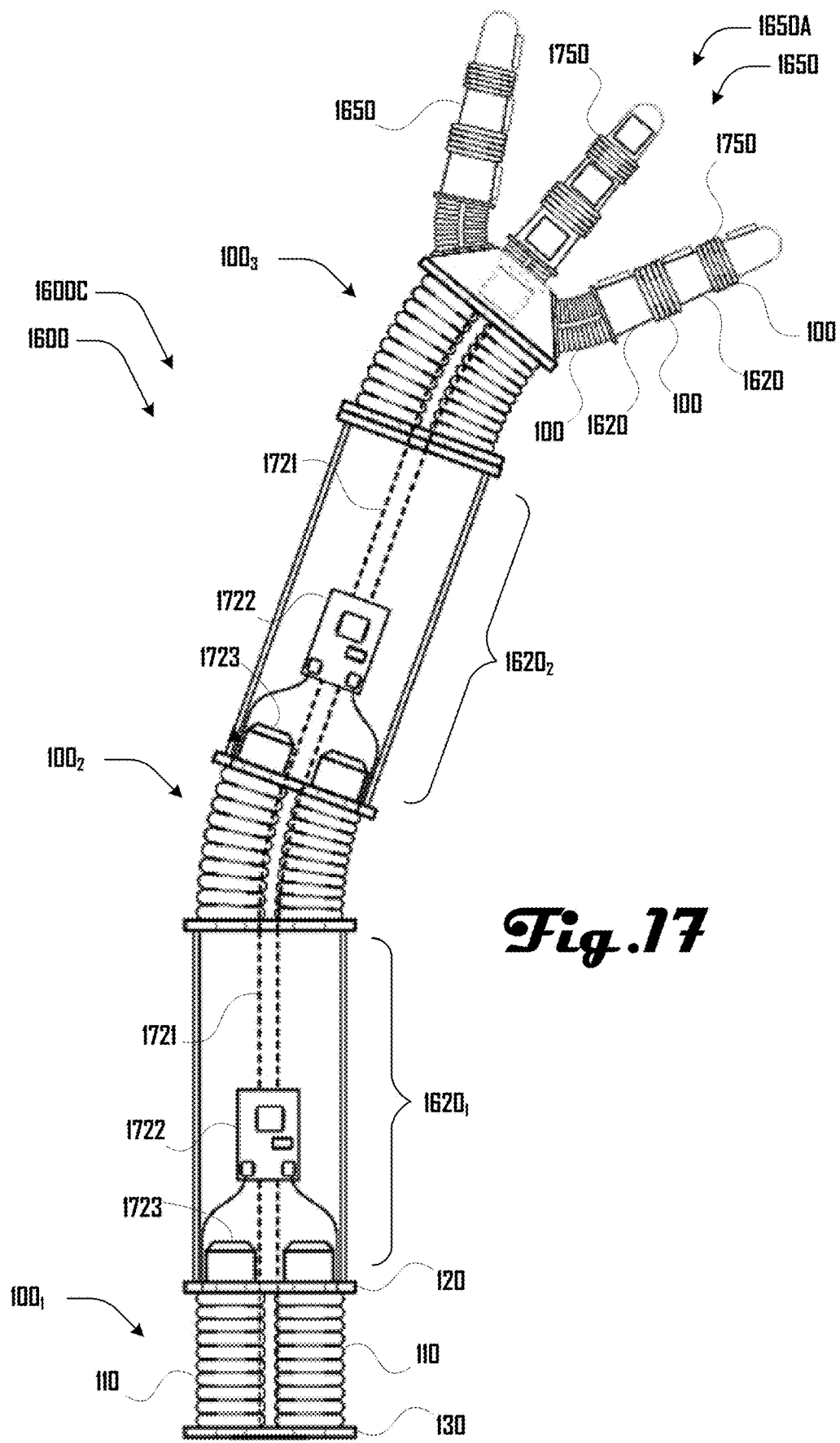
FIG. 17 illustrates a robotic manipulator having three identical actuators with linkages therebetween and an end effector that comprises three fingers that are each defined by a smaller series of actuators and linkages.

Linkages 1620 can be various suitable structures operable to couple successive actuators 100, to each other, to the base 1610 or to an end effector 1650. The linkages 1620 can be structurally connected by mechanically coupling the end plate 120, 130 of one actuator 100 to the next. Additionally, linkages 1620 can also be configured to link multiple robotic manipulators 1600 (e.g., as shown in FIG. 17).

The linkage can comprise structures including a brace, tube, or multi part shell that is attached to the end plates 120, 130 and/or spine 140 using bolts, brackets, clamps, a friction interface, adhesives, or other structural interfaces. In some embodiments, the linkages 1620 can be angled such that the joints are not mounted on a straight line, which can allow for the center of rotations of the joints to not be co-linear.

In some embodiments, one or more linkage 1620 can comprise a passive, non-moving structure that is configured to convey or house various control, sensing and/or fluidic components such as controllers, valves, fluid lines, communication lines, power lines, or the like. For example, FIG. 17 illustrates an embodiment 1600C of a robotic manipulator 1600 that comprises linkages 1620 that comprise a passive, non-moving structure.

In further examples, one or more linkages 1620 can comprise active moving elements. For example, FIG. 18 illustrates an example embodiment 1600D of a robotic manipulator 1600 having linkages 1620 that define rotary joints that are operable to rotate about one or more axis.

The actuators 100 can comprise any suitable actuator as described herein. In some embodiments, all actuators 100 of a robotic manipulator 1600 can be the same or one or more actuators 100 can be different. Such different actuators can be different in terms of structure, size, or the like. For example, FIG. 17 illustrates a robotic manipulator 1600 having three identical actuators 100₁, 100₂, 100₃, with linkages 1620₁, 1620₂, therebetween and an end effector 1650 that comprises three fingers 1750 that are each defined by a smaller series of actuators 100 and linkages 1620.

Figure 18:
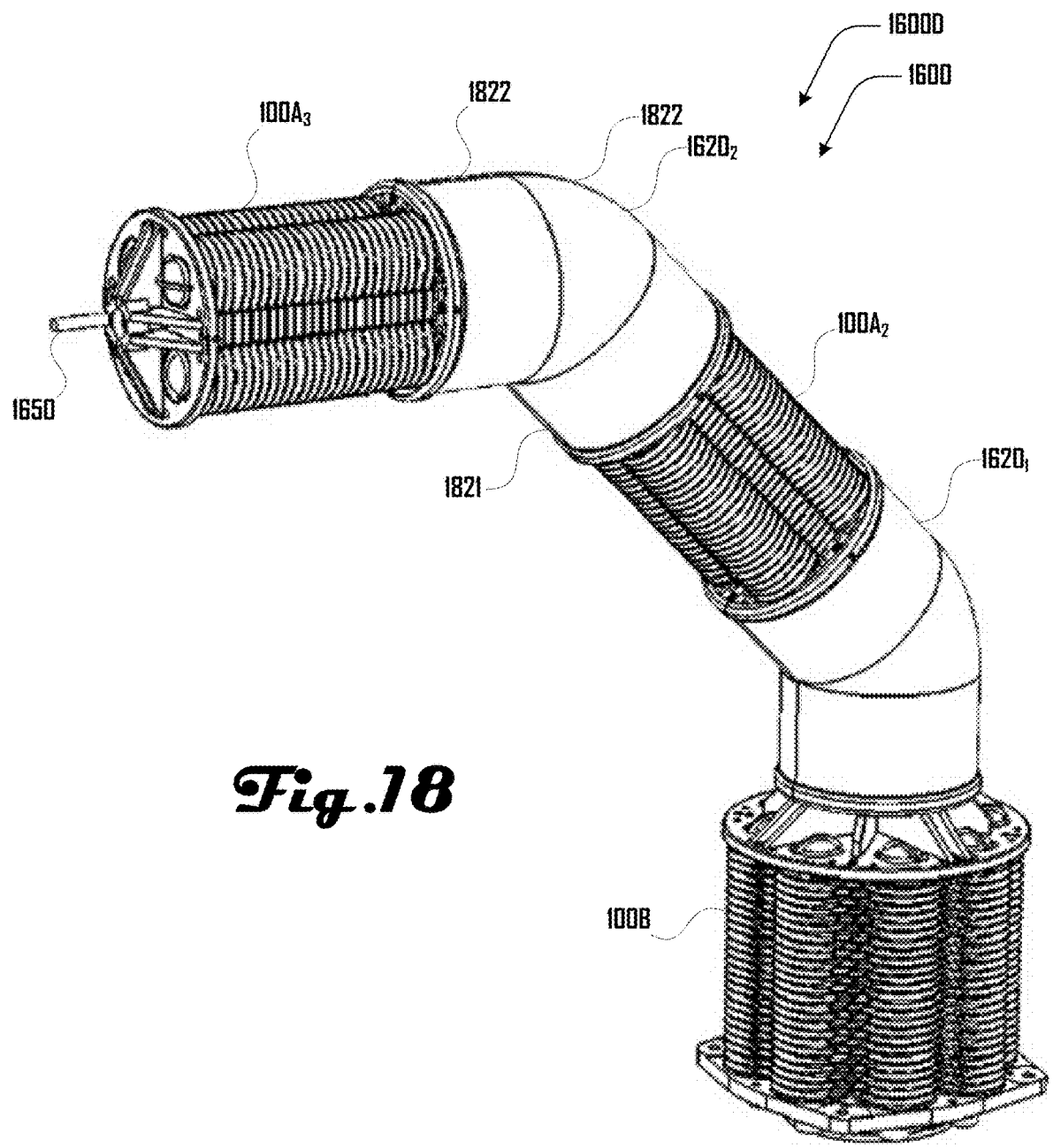
FIG. 18 illustrates a robotic manipulator comprising two identical four-bellows actuators and one larger eight-bellows actuator with linkages therebetween and an end effector.

In another example, FIG. 18 illustrates a robotic manipulator 1600D comprising two identical actuators 100A₂, 100A₃ (e.g., the actuator 100A shown in FIGS. 1 and 2) and one actuator 100B (e.g., the actuator 100B shown in FIG. 14) with linkages 1620₁, 1620₂, therebetween and an end effector 1650. An end effector 1650 is coupled directly to the second actuator 100A₃, which is defined by a rod. This example embodiment can comprise six-degrees of freedom with a higher torque base actuator 100B.

Although example embodiments 1600A, 1600B, 1600C and 1600D of robotic manipulators are illustrated in FIGS. 16a, 16b, 17 and 18, it should be clear that any suitable further embodiments of robotic manipulators 1600 are within the scope and spirit of the present disclosure, including robotic manipulators 1600 with any suitable number of actuators 100 and any suitable number of bases 1610, linkages 1620, or end effectors 1650. Also, in various embodiments, linkages 1620, and/or end effectors 1650 can be absent.

The number and size of the bellows 110 in each actuator 100 of the manipulator 1600 can be tuned to create joints with different properties. For example, as shown in FIG. 18 a base actuator 100B can include eight bellows 110 to produce the larger torques required to support the distal actuators 100₂, 100₃, and payloads such as the end effector 1650 or loads borne by the end effector 1650.

The end effector 1650 can be mounted to a distal actuator 100 or to a distal linkage 1620 to allow for manipulation of payloads, and the like. The end effector 1650 can include any suitable structure, including a robotic hand, robotic manipulator, drill, saw, paint-brush, screwdriver, wrench, or the like. Additionally, the end effector 1650 can be modular and removable in various embodiments. Also, the end effector 1650 and/or robotic manipulator 1600 can be configured for various suitable tasks, including warehouse work, manufacturing, construction (e.g., hanging drywall, applying drywall joints, painting, polishing, sanding, grinding, and the like). Also, the end effector 1650 and/or robotic manipulator 1600 can be configured for various suitable environments, including in space or in terrestrial environments such as on the ground, in the ocean, in the air, or the like. Also, the actuators 100 and linkages 1620, and the like, can be covered by foam or other similar covering to protect the system, create a soft interface for planned or incidental contacts, decrease impact forces, and the like.

In various embodiments, the actuators of a robotic manipulator 1600 can share a common fluid source 1611 and as shown in FIG. 17, lines 1721 such as fluid lines can extend through the linkages 1620 and actuators 100 to provide fluid to and/or receive fluid from the internal cavities 300 of the bellows 110 of the respective actuators. Accordingly, in various embodiments each of the bellows 110 of each of a plurality of actuators 100 of a robotic manipulator 1600 can be individually controlled from one or more shared fluid source 1611. FIGS. 16a and 16b show an example where a fluid source 1611 is associated with or disposed within the base 1610, and this fluid source 1611 is used to control bellows 110 of respective actuators 100. However, in some embodiments, linkages 1620 can comprise a fluid reservoir, which may or may not be shared by all actuators 100.

Similarly, other lines 1721 such as power lines, communication lines, and the like, can also extend internally through the robotic manipulator 1600 as shown in FIG. 17. In some embodiments, respective pumps 1723 can be coupled proximate to the bellows 110 of each actuator. These pumps 1723 can be controlled by a local controller 1722 disposed in a linkage 1620 proximate to the actuator 100 as shown in FIG. 17 and/or can be controlled by a shared controller 1612 as illustrated in FIGS. 16a and 16b. Communication lines and/or power lines related to such controllers 1722, 1612 can extend internally through the length of the robotic manipulator 1600. In various embodiments, components of a robotic manipulator 1600 can also operate from a shared power source.

Additionally, various sensors can be associated with one or more actuator 100 can send data to shared and/or local controllers 1722, 1612 and such controllers 1722, 1612 can process such data to determine various states of the robotic manipulator 1600. For example, a kinematic and dynamic model of the manipulator may be used to improve the estimation of the robot state based on data received from sensors associated with the robotic manipulator 1600. In one embodiment, inertial measurement units (IMUS) can be mounted on each actuator end plate 120, 130, linkage 1620, or the like, and can be used to estimate the state of the robotic manipulator 1600.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A robotic manipulator comprising:
   a plurality of actuators configured to assume at least a neutral position, each of the actuators including:
      a first and second plate defining respective planar portions that are disposed in parallel planes in the neutral position;

four elongated cylindrical bellows extending between the first and second plate and disposed in a square arrangement, the bellows each having a central main axis that is parallel to the central main axis of the other bellows in the neutral position, the main axis of the bellows being perpendicular to the parallel planes of the first and second plate in the neutral position, the bellows being coupled to the first and second plate at respective first and second ends, the bellows comprising convolutions along a length of the bellows between the first and second plate with the convolutions being defined by valley and peak portions;

an elongated spine extending between and coupled to the first and second plate, the spine disposed centrally within a cavity between the four bellows, the spine configured to bend but not expand or contract along the length of the spine;

dampening foam disposed in at least one of:
within an internal cavity defined by the bellows;
within the cavity between the four bellows and engaging the four bellows; and
surrounding the four bellows; and a plurality of ribs disposed within the cavity and extending between the four bellows, each of the ribs engaging each of the four bellows in the valley portions of the convolutions, with the ribs extending in respective rib planes that are parallel to the parallel planes of the first and second plate in the neutral position;

a plurality of linkages, with a first linkage coupling a first and second actuator of the plurality of actuators, the first linkage disposed between the first and second actuator in series;

an end effector coupled to a distal end of the robotic manipulator;

a shared fluid source that is fluidically coupled with each of the bellows of the plurality of actuators via one or more fluid lines that at least extend internally through the series of the first linkage and the first and second actuator down the center of the first and second actuators; and a control system configured to control movement of the actuators by selectively changing a fluid pressure of individual bellows of the plurality of actuators via control lines that extend internally through the series of the first linkage and the first and second actuator.

2. The robotic manipulator of claim 1, further comprising a further actuator, the further actuator configured to assume a neutral position and comprising:

a first and second further plate defining respective planar portions that are disposed in parallel planes in the neutral position;

eight elongated cylindrical bellows extending between the first and second plate and disposed in an octagonal arrangement, the bellows of the further actuator each having a central main axis that is parallel to the central main axis of the other bellows of the further actuator in the neutral position, the main axis of the bellows of the further actuator being perpendicular to the parallel planes of the first and second further plate in the neutral position, the bellows of the further actuator being coupled to the first and second further plate at respective first and second ends, the bellows of the further actuator comprising convolutions along a length of the bellows between the first and second further plate with the convolutions of the further actuator being defined by valley and peak portions;

an elongated further spine extending between and coupled to the first and second further plates, the further spine disposed centrally within a second cavity between the eight bellows of the further actuator, the further spine configured to bend but not expand or contract along the length of the further spine; and a plurality of further ribs disposed within the second cavity and extending between the eight bellows of the further actuator, each of the further ribs engaging each of the eight bellows in the valley portions of the convolutions, with the further ribs extending in respective rib planes that are parallel to the parallel planes of the first and second further plates in the neutral position.

3. The robotic manipulator of claim 1, wherein each of the plurality of actuators comprise a sensor configured to measure a joint angle of the actuator.

4. The robotic manipulator of claim 1, wherein each of the plurality of actuators comprise a reinforcing line that surrounds and resides within a portion of a valley of at least one bellows, the reinforcing line being a portion of a wrapping that includes one of:
a wrapping that peripherally surrounds the four bellows on respective external faces of the bellows and within valleys of the four bellows;
a wrapping that completely surrounds at least one valley of a single bellows; and
a wrapping that incompletely surrounds at least one valley of a single bellows.

5. A fluidic robotic actuator configured to assume at least a neutral position, the fluidic robotic actuator comprising:

a first and second plate defining respective planar portions that are disposed in parallel planes in the neutral position;

four elongated cylindrical bellows extending between the first and second plate and disposed in a square arrangement, the bellows each having a central main axis that is parallel to the central main axis of the other bellows in the neutral position, the main axis of the bellows being perpendicular to the parallel planes of the first and second plate in the neutral position, the bellows being coupled to the first and second plate at respective first and second ends, the bellows comprising convolutions along a length of the bellows between the first and second plate with the convolutions being defined by valley and peak portions;

an elongated spine extending between and coupled to the first and second plate, the spine disposed centrally within a cavity between the four bellows, the spine configured to bend but not expand or contract along the length of the spine;

dampening foam disposed in at least one of:
within an internal cavity defined by the bellows;
within the cavity between the four bellows and engaging the four bellows; and
surrounding the four bellows; and a plurality of ribs disposed within the cavity and extending between the four bellows, each of the ribs engaging each of the four bellows in the valley portions of the convolutions, with the ribs extending in respective rib planes that are parallel to the parallel planes of the first and second plate in the neutral position.

6. The fluidic robotic actuator of claim 5, further comprising a sensor configured to measure changes in a distance between two locations of the actuator occurring during actuation of the actuator, the measured changes for calculating a joint angle in one plane of the actuator.

7. The fluidic robotic actuator of claim 5, further comprising a reinforcing line that surrounds and resides within a portion of a valley of at least one bellows, the reinforcing line being a portion of a wrapping that includes one of:
   a wrapping that peripherally surrounds the four bellows on an external face within valleys of the four bellows;
   a wrapping that completely surrounds at least one valley of a single bellows; and
   a wrapping that incompletely surrounds at least one valley of a single bellows.

8. A fluidic robotic actuator configured to assume at least a neutral position, the fluidic robotic actuator comprising:
   a first and second plate defining respective planar portions that are disposed in parallel planes in the neutral position; and
   a plurality of elongated bellows extending between the first and second plate, the bellows each having a central main axis that is parallel to the central main axis of the other bellows in the neutral position, the main axis of the bellows being perpendicular to the parallel planes of the first and second plate in the neutral position, the bellows being coupled to the first and second plate at respective first and second ends of the bellows; and
   dampening foam disposed in at least one of:
      within an internal cavity defined by the bellows;
      within a cavity between the four bellows and engaging the four bellows; and
      surrounding the plurality of bellows.

9. The fluidic robotic actuator of claim 8 further comprising an elongated spine extending between and coupled to the first and second plate, the spine disposed centrally within a cavity between the plurality of bellows.

10. The fluidic robotic actuator of claim 9, wherein the spine is configured to bend but not expand or contract along the length of the spine.

11. The fluidic robotic actuator of claim 8 further comprising a plurality of ribs disposed within a cavity between the plurality of bellows and extending between the plurality of bellows, each of the ribs engaging each of the plurality bellows with the ribs extending in respective rib planes that are parallel to the parallel planes of the first and second plate in the neutral position.

12. The fluidic robotic actuator of claim 8, further comprising dampening foam disposed in at least one of:
   within an internal cavity defined by the bellows;
   within the cavity between the plurality of bellows and engaging the plurality of bellows; and
   surrounding the plurality of bellows.

13. The fluidic robotic actuator of claim 8, further comprising a pressure sensor disposed at a bellows port defined at the first end of a first bellows.

14. The fluidic robotic actuator of claim 8, further comprising a first bellows port disposed at the first end of a first bellows and a second bellows port disposed at the second end of the first bellows.

15. The fluidic robotic actuator of claim 8, further comprising a sensor configured to determine a joint angle of the actuator by measuring a distance between a first and second component of the actuator.

16. A fluidic robotic actuator configured to assume at least a neutral position, the fluidic robotic actuator comprising:
   a first and second plate defining respective planar portions that are disposed in parallel planes in the neutral position;
   a plurality of elongated bellows extending between the first and second plate, the bellows each having a central main axis that is parallel to the central main axis of the other bellows in the neutral position, the main axis of the bellows being perpendicular to the parallel planes of the first and second plate in the neutral position, the bellows being coupled to the first and second plate at respective first and second ends of the bellows; and
   a reinforcing line that surrounds and resides within a portion of a valley of at least one bellows, the reinforcing line being a portion of a wrapping that includes one of:
      a wrapping that peripherally surrounds the plurality of bellows on an external face within valleys of the plurality of bellows;
      a wrapping that completely surrounds at least one valley of a single bellows; and
      a wrapping that incompletely surrounds at least one valley of a single bellows.

17. A fluidic robotic actuator configured to assume at least a neutral position, the fluidic robotic actuator comprising:
   a first and second plate defining respective planar portions that are disposed in parallel planes in the neutral position;
   a plurality of elongated bellows extending between the first and second plate, the bellows each having a central main axis that is parallel to the central main axis of the other bellows in the neutral position, the main axis of the bellows being perpendicular to the parallel planes of the first and second plate in the neutral position, the bellows being coupled to the first and second plate at respective first and second ends of the bellows,
   wherein the bellows extend through and couple with coupling ports defined by the first and second plate, with at least the portion of the bellows engaging the coupling ports being without axial symmetry.

18. The fluidic robotic actuator of claim 17, wherein the bellows comprise convolutions along a length of the bellows between the first and second plate with the convolutions being defined by valley and peak portions.

19. The fluidic robotic actuator of claim 18, wherein the bellows have axial symmetry along the length of the bellows between the first and second plate.

* * * * *